US011884525B2

(12) United States Patent
Bhatia et al.

(10) Patent No.: US 11,884,525 B2
(45) Date of Patent: Jan. 30, 2024

(54) SYSTEMS AND METHODS FOR LIMITING OPERATION OF A LIFT DEVICE

(71) Applicant: Oshkosh Corporation, Oshkosh, WI (US)

(72) Inventors: Shashank Bhatia, Oshkosh, WI (US); Aaron Powers, Oshkosh, WI (US); Michael W. Stouffer, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 761 days.

(21) Appl. No.: 16/811,470

(22) Filed: Mar. 6, 2020

(65) Prior Publication Data

US 2020/0317492 A1 Oct. 8, 2020

Related U.S. Application Data

(60) Provisional application No. 62/829,941, filed on Apr. 5, 2019.

(51) Int. Cl.
*B66F 17/00* (2006.01)
*B66F 11/04* (2006.01)
(Continued)

(52) U.S. Cl.
CPC .......... *B66F 17/006* (2013.01); *B66F 11/042* (2013.01); *B66F 13/00* (2013.01); *B66F 7/0666* (2013.01)

(58) Field of Classification Search
CPC .... B66F 7/0625; B66F 7/0666; B66F 11/042; B66F 17/006; B66F 7/08; B66F 7/065;
(Continued)

(56) References Cited

U.S. PATENT DOCUMENTS 9,387,985 B2 7/2016 Gillmore et al.
9,694,671 B2 7/2017 Wildgrube et al.
(Continued)

FOREIGN PATENT DOCUMENTS

CN 109502522 A 3/2019
CN 114577432 * 6/2022
WO WO-2018/140619 A2 8/2018

OTHER PUBLICATIONS

Mobile elevating work platforms (prEN 280:2009 (E)) (Year: 2009).*
(Continued)

*Primary Examiner* — Mahdi H Nejad
(74) *Attorney, Agent, or Firm* — Foley & Larnder LLP

(57) ABSTRACT

A lift device includes a lift assembly, a platform, and a controller. The lift assembly is configured to be driven to increase or decrease in length by extension and retraction of one or more actuators. The platform is coupled at an upper end of the lift assembly. The controller is configured to receive a value of a pitch angle and a roll angle of the lift device from an orientation sensor. The controller is further configured to determine a maximum allowable elevation of the platform based on at least one of the value of the roll angle and the value of the pitch angle of the lift device. The controller is further configured to limit operation of the lift assembly based on the maximum allowable elevation of the platform.

20 Claims, 7 Drawing Sheets

(51) Int. Cl.
*B66F 13/00* (2006.01)
*B66F 7/06* (2006.01)

(58) Field of Classification Search
CPC . B66F 7/28; B66F 13/00; B60N 2/508; B60N 2/502
See application file for complete search history.

(56) References Cited

U.S. PATENT DOCUMENTS

| | | | | |
|---|---|---|---|---|
| 9,776,846 | B2 | 10/2017 | Ditty | |
| 9,791,071 | B2 | 10/2017 | Ditty et al. | |
| 9,845,191 | B2 | 12/2017 | Schwartz et al. | |
| 10,174,868 | B2 | 1/2019 | Ditty et al. | |
| 10,336,596 | B2 | 7/2019 | Puszkiewicz et al. | |
| 10,357,995 | B2 | 7/2019 | Palmer et al. | |
| 10,472,889 | B1 | 11/2019 | Betz | |
| 10,479,664 | B2 | 11/2019 | Linsmeier et al. | |
| 10,611,347 | B1 | 4/2020 | Archer et al. | |
| 10,617,900 | B1 | 4/2020 | Linsmeier et al. | |
| 11,746,500 | B2 * | 9/2023 | Kobel | E02F 9/265 701/2 |
| 2007/0208476 | A1 * | 9/2007 | Baginski | B66F 9/0755 701/50 |
| 2015/0166315 | A1 * | 6/2015 | Knapp | B66F 1/06 254/90 |
| 2015/0246797 | A1 * | 9/2015 | Jaipaul | B66F 3/46 700/213 |
| 2017/0130429 | A1 * | 5/2017 | Lafrenier | B60Q 5/005 |
| 2017/0217745 | A1 * | 8/2017 | Artoni | B62D 21/00 |
| 2017/0291805 | A1 * | 10/2017 | Hao | B66F 5/04 |
| 2019/0126912 | A1 * | 5/2019 | Peterson | A01B 63/22 |
| 2019/0137006 | A1 | 5/2019 | Ditty et al. | |
| 2019/0322512 | A1 | 10/2019 | Puszkiewicz et al. | |
| 2019/0359460 | A1 | 11/2019 | Linsmeier et al. | |
| 2020/0071996 | A1 | 3/2020 | Betz | |
| 2020/0140248 | A1 | 5/2020 | Hackenberg et al. | |
| 2020/0140249 | A1 | 5/2020 | Hackenberg et al. | |
| 2020/0317486 | A1 * | 10/2020 | Puszkiewicz | B66F 9/07513 |
| 2021/0278042 | A1 * | 9/2021 | Liang | E05B 65/46 |
| 2022/0198905 | A1 * | 6/2022 | Brulo | G01S 17/88 |
| 2023/0079946 | A1 * | 3/2023 | Fung | B66F 9/07509 182/19 |
| 2023/0131482 | A1 * | 4/2023 | Kobel | B66F 11/04 701/2 |

OTHER PUBLICATIONS

International Search Report and Written Opinion for International Application No. PCT/US2020/021436 dated Jun. 26, 2020, 19 pages.
ANSI/SAIA Standard A92.20-2018, “Design, Calculations, Safety Requirements and Test Methods for Mobile Elevating Work Platforms (MEWPs)”, published Dec. 10, 2018.

* cited by examiner

SYSTEMS AND METHODS FOR LIMITING OPERATION OF A LIFT DEVICE

CROSS-REFERENCE TO RELATED PATENT APPLICATION

The present application claims the benefit of and priority to U.S. Provisional Patent Application No. 62/829,941, filed Apr. 5, 2019, the entire disclosure of which is incorporated by reference herein.

BACKGROUND

Certain aerial work platforms, known as scissor lifts, incorporate a frame assembly that supports a platform. The platform is coupled to the frame assembly using a system of linked supports arranged in a crossed pattern, forming a scissor assembly. As the supports rotate relative to one another, the scissor assembly extends or retracts, raising or lowering the platform relative to the frame. Accordingly, the platform moves primarily or entirely vertically relative to the frame assembly. Scissor lifts are commonly used where scaffolding or a ladder might be used, as they provide a relatively large platform from which to work that can be quickly and easily adjusted to a broad range of heights. Scissor lifts are commonly used for painting, construction projects, accessing high shelves, changing lights, and maintaining equipment located above the ground.

SUMMARY

One implementation of the present disclosure is a lift device, according to an exemplary embodiment. The lift device includes a lift assembly, a platform, and a controller. The lift assembly is configured to be driven to increase or decrease in length by extension and retraction of one or more actuators. The platform is coupled at an upper end of the lift assembly. The controller is configured to receive a value of a pitch angle and a roll angle of the lift device from an orientation sensor. The controller is further configured to determine a maximum allowable elevation of the platform based on at least one of the value of the roll angle and the value of the pitch angle of the lift device. The controller is further configured to limit operation of the lift assembly based on the maximum allowable elevation of the platform.

Another implementation of the present disclosure is a method for limiting operation of a scissors lift device, according to an exemplary embodiment. The method includes obtaining a value of a pitch or a roll of the scissors lift device. The method further includes determining a threshold elevation of the platform using at least one of the value of the pitch or the roll of the scissors lift device. The method further includes limiting an elevation operation of the scissors lift device using the threshold elevation of the platform.

Another implementation of the present disclosure is a control system for a lift device, according to an exemplary embodiment. The control system includes a user interface, and a controller. The user interface is configured to receive a user input to operate the lift device and provide an alert to a user of the lift device. The controller is configured to obtain a value of a pitch or a roll of the scissors lift device. The controller is further configured to determine a threshold extension of the lift device using at least one of the value of the pitch or the roll. The controller is further configured to limit extension of the lift device using the threshold extension.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
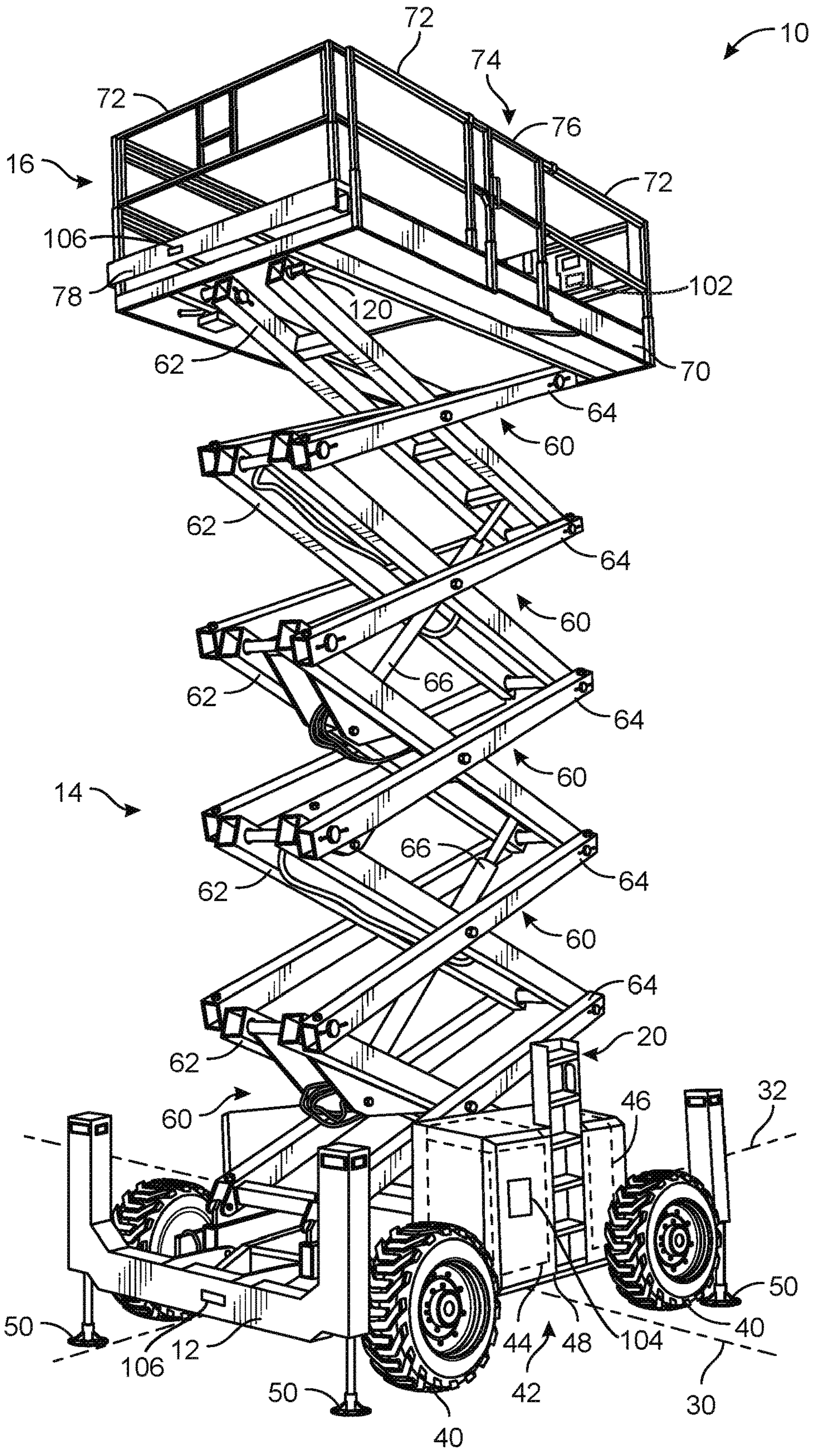
FIG. 1 is a perspective view of a lift device, according to an exemplary embodiment.

Before turning to the figures, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Referring generally to the FIGURES, a lift device is shown, according to various exemplary embodiment. The lift device includes a frame assembly, a lifting assembly, and a platform. The platform is coupled with the lifting assembly at an upper end of the lifting assembly. The lift device includes a load sensor, a lifting assembly extension sensor, and an orientation sensor. The lift device also include a controller configured to receive sensory information from any of the load sensor, the lifting assembly extension sensor, and the orientation sensor. The load sensor is configured to measure load applied at the platform (e.g., due to workers, equipment, etc.). The lifting assembly extension sensor is configured to measure extension/height of the lifting assembly, according to some embodiments. In some embodiments, the lifting assembly extension sensor is configured to measure a distance (e.g., a width) or an angle of the lifting assembly that can be used by the controller to determine a current value of height of the lifting assembly. The orientation sensor is configured to measure any of a pitch, a roll, and/or a yaw angle of the lift device.

The controller is configured to use any of, or a combination of, the measured load applied at the platform, the pitch angle of the lift device, and the roll angle of the lift device to determine a maximum allowable height of the platform. The controller is configured to receive user inputs from a human machine interface and operate the lifting assembly to extend or retract to raise and lower the platform based on the user inputs. The controller can operate the human machine interface to display the maximum allowable height of the platform. The controller can also operate the human machine interface to display a current height of the platform relative to a ground surface, relative to the frame assembly, etc.

The controller is configured to restrict operation of the lifting assembly in the upwards direction (e.g., to restrict the lifting assembly from operating to raise the platform) in response to the platform being substantially at the maximum allowable height. The controller can monitor the current height of the platform and compare the current height of the platform to the maximum allowable height of the platform. The controller can operate visual notification and/or aural notification devices of the human machine interface to provide any of a visual alert and an aural alert to the operator of the lift device in response to the platform being near or at the maximum allowable height. In some embodiments, when the platform is at the maximum allowable height, the controller prevents platform from elevating further. However, the controller may still allow the operator to control the lift device such that the platform is lowered, even if the platform is at the maximum allowable height.

Advantageously, preventing the lifting assembly from raising the platform above the maximum allowable height facilitates reducing the likelihood that the lift device will tip or roll. Additionally, providing the maximum allowable height to the operator through the human machine interface facilitates allowing the operator to know if the platform can be raised to reach a desired work area. The operator can then reposition the lift device (e.g., by driving and steering the lift device) to more level ground until the maximum allowable height of the platform is sufficient to reach the desired work area. In some embodiments, the lift device includes a leveling system. The leveling system can be operated automatically by the controller based on the pitch angle and/or the roll angle to level the lift device, thereby increasing the maximum allowable height of the platform. In other embodiments, the operator can operate the leveling system (e.g., leveling actuators) to level the lift device.

According to the exemplary embodiment shown in FIG. 1, a lift device (e.g., a scissor lift, an aerial work platform, a boom lift, a telehandler, etc.), shown as lift device 10, includes a chassis, shown as frame assembly 12. A lift device (e.g., a scissor assembly, a boom assembly, etc.), shown as lift assembly 14, couples frame assembly 12 to a platform, shown as platform 16. Frame assembly 12 supports lift assembly 14 and platform 16, both of which are disposed directly above frame assembly 12. In use, lift assembly 14 extends and retracts to raise and lower platform 16 relative to frame assembly 12 between a lowered position and a raised position. Lift device 10 includes an access assembly, shown as an access assembly 20, that is coupled to frame assembly 12 and configured to facilitate access to platform 16 from the ground by an operator when platform 16 is in the lowered position.

Referring again to FIG. 1, frame assembly 12 defines a horizontal plane having a lateral axis 30 and a longitudinal axis 32. In some embodiments, frame assembly 12 is rectangular, defining lateral sides extending parallel to lateral axis 30 and longitudinal sides extending parallel to longitudinal axis 32. In some embodiments, frame assembly 12 is longer in a longitudinal direction than in a lateral direction. In some embodiments, lift device 10 is configured to be stationary or semi-permanent (e.g., a system that is installed in one location at a work site for the duration of a construction project). In such embodiments, frame assembly 12 may be configured to rest directly on the ground and/or lift device 10 may not provide powered movement across the ground. In other embodiments, lift device 10 is configured to be moved frequently (e.g., to work on different tasks, to continue the same task in multiple locations, to travel across a job site, etc.). Such embodiments may include systems that provide powered movement across the ground.

Referring to FIG. 1, lift device 10 is supported by a plurality of tractive assemblies 40, each including a tractive element (e.g., a tire, a track, etc.), that are rotatably coupled to frame assembly 12. tractive assemblies 40 may be powered or unpowered. As shown in FIG. 1, tractive assemblies 40 are configured to provide powered motion in the direction of longitudinal axis 32. One or more of tractive assemblies 40 may be turnable to steer lift device 10. In some embodiments, lift device 10 includes a powertrain system 42. In some embodiments, powertrain system 42 includes a primary driver 44 (e.g., an engine). A transmission may receive the mechanical energy and provide an output to one or more of tractive assemblies 40. In some embodiments, powertrain system 42 includes a pump 46 configured to receive mechanical energy from primary driver 44 and output a pressurized flow of hydraulic fluid. Pump 46 may supply mechanical energy (e.g., through a pressurized flow of hydraulic fluid) to individual motive drivers (e.g., hydraulic motors) configured to facilitate independently driving each of tractive assemblies 40. In other embodiments, powertrain system 42 includes an energy storage device (e.g., a battery, capacitors, ultra-capacitors, etc.) and/or is electrically coupled to an outside source of electrical energy (e.g., a standard power outlet). In some such embodiments, one or more of tractive assemblies 40 include an individual motive driver (e.g., a motor that is electrically coupled to the energy storage device, etc.) configured to facilitate independently driving each of tractive assemblies 40. The outside source of electrical energy may charge the energy storage device or power the motive drivers directly. Powertrain system 42 may additionally or alternatively provide mechanical energy (e.g., using the pump 46, by supplying electrical energy, etc.) to one or more actuators of lift device 10 (e.g., leveling actuators 50, lift actuators 66, stair actuator 230, etc.). One or more components of powertrain system 42 may be housed in an enclosure, shown as housing 48. Housing 48 is coupled to frame assembly 12 and extends from a side of lift device 10 (e.g., a left or right side). Housing 48 may include one or more doors to facilitate access to components of powertrain system 42.

In some embodiments, frame assembly 12 is coupled to one or more actuators, shown in FIG. 1 as leveling actuators 50. Lift device 10 includes four leveling actuators 50, one in each corner of frame assembly 12. Leveling actuators 50 extend and retract vertically between a stored position and a deployed position. In the stored position, leveling actuators 50 are raised and do not contact the ground. In the deployed position, leveling actuators 50 contact the ground, lifting frame assembly 12. The length of each of leveling actuators 50 in their respective deployed positions may be varied to adjust the pitch (i.e., rotational position about lateral axis 30) and the roll (i.e., rotational position about longitudinal axis 32) of frame assembly 12. Accordingly, the lengths of leveling actuators 50 in their respective deployed positions may be adjusted such that frame assembly 12 is leveled with respect to the direction of gravity, even on uneven or sloped terrains. Leveling actuators 50 may additionally lift the tractive elements of tractive assemblies 40 off the ground, preventing inadvertent driving of lift device 10.

Referring to FIG. 1, lift assembly 14 includes a number of subassemblies, shown as scissor layers 60, each including a first member, shown as inner member 62, and a second member, shown as outer member 64. In each scissor layer 60, outer member 64 receives inner member 62. Inner member 62 is pivotally coupled to outer member 64 near the centers of both inner member 62 and outer member 64. Accordingly, inner member 62 pivots relative to the outer member 64 about a lateral axis. Scissor layers 60 are stacked atop one another to form lift assembly 14. Each inner member 62 and each outer member 64 has a top end and a bottom end. The bottom end of each inner member 62 is pivotally coupled to the top end of the outer member 64 immediately below it, and the bottom end of each outer member 64 is pivotally coupled to the top end of inner member 62 immediately below it. Accordingly, each of scissor layers 60 are coupled to one another such that movement of one scissor layer 60 causes a similar movement in all of the other scissor layers 60. The bottom ends of inner member 62 and outer member 64 belonging to the lowermost of scissor layers 60 are coupled to frame assembly 12. The top ends of inner member 62 and outer member 64 belonging to the uppermost of scissor layers 60 are coupled to platform 16. Inner members 62 and/or outer members 64 are slidably coupled to frame assembly 12 and platform 16 to facilitate the movement of lift assembly 14. Scissor layers 60 may be added to or removed from lift assembly 14 to increase or decrease, respectively, the maximum height that platform 16 is configured to reach.

One or more actuators (e.g., hydraulic cylinders, pneumatic cylinders, motor-driven leadscrews, etc.), shown as lift actuators 66, are configured to extend and retract lift assembly 14. As shown in FIG. 1, lift assembly 14 includes a pair of lift actuators 66. Lift actuators 66 are pivotally coupled to an inner member 62 at one end and pivotally coupled to another inner member 62 at the opposite end. These inner members 62 belong to a first scissor layer 60 and a second scissor layer 60 that are separated by a third scissor layer 60. In other embodiments, lift assembly 14 includes more or fewer lift actuators 66 and/or lift actuators 66 are otherwise arranged. Lift actuators 66 are configured to actuate lift assembly 14 to selectively reposition platform 16 between the lowered position, where platform 16 is proximate frame assembly 12, and the raised position, where platform 16 is at an elevated height. In some embodiments, extension of lift actuators 66 moves platform 16 vertically upward (extending lift assembly 14), and retraction of the linear actuators moves platform 16 vertically downward (retracting lift assembly 14). In other embodiments, extension of lift actuators 66 retracts lift assembly 14, and retraction of lift actuators 66 extends lift assembly 14. In some embodiments, outer members 64 are approximately parallel and/or contacting one another when with lift assembly 14 in a stored position. Lift device 10 may include various components to drive lift actuators 66 (e.g., pumps, valves, compressors, motors, batteries, voltage regulators, etc.).

Referring again to FIG. 1, platform 16 includes a support surface, shown as deck 70, defining a top surface configured to support operators and/or equipment and a bottom surface opposite the top surface. The bottom surface and/or the top surface extend in a substantially horizontal plane. A thickness of deck 70 is defined between the top surface and the bottom surface. The bottom surface is coupled to a top end of lift assembly 14. In some embodiments, deck 70 is rectangular. In some embodiments, deck 70 has a footprint that is substantially similar to that of frame assembly 12.

Referring again to FIG. 1, a number of guards or railings, shown as guard rails 72, extend upwards from deck 70. Guard rails 72 extend around an outer perimeter of deck 70, partially or fully enclosing a supported area on the top surface of deck 70 that is configured to support operators and/or equipment. Guard rails 72 provide a stable support for the operators to hold and facilitate containing the operators and equipment within the supported area. Guard rails 72 define one or more openings 74 through which the operators can access deck 70. Opening 74 may be a space between two guard rails 72 along the perimeter of deck 70, such that guard rails 72 do not extend over opening 74. Alternatively, opening 74 may be defined in a guard rail 72 such that guard rail 72 extends across the top of opening 74. In some embodiments, platform 16 includes a door 76 that selectively extends across opening 74 to prevent movement through opening 74. Door 76 may rotate (e.g., about a vertical axis, about a horizontal axis, etc.) or translate between a closed position, shown in FIG. 1, and an open position. In the closed position, door 76 prevents movement through opening 74. In the open position, door 76 facilitates movement through opening 74.

Referring again to the embodiments of FIG. 1, platform 16 further includes one or more platforms, shown as extendable decks 78, that are received by deck 70 and that each define a top surface. Extendable decks 78 are selectively slidable relative to the deck 70 between an extended position and a retracted position. In the retracted position, shown in FIG. 1, extendable decks 78 are completely or almost completely received by deck 70. In the extended position, extendable decks 78 project outward (e.g., longitudinally, laterally, etc.) relative to deck 70 such that their top surfaces are exposed. With extendable decks 78 projected, the top surfaces of extendable decks 78 and the top surface of deck 70 are all configured to support operators and/or equipment, expanding the supported area. In some embodiments, extendable decks 78 include guard rails partially or fully enclose the supported area. Extendable decks 78 facilitate accessing areas that are spaced outward from frame assembly 12.

Referring to FIG. 1, access assembly 20 is coupled to a longitudinal side of frame assembly 12. As shown in FIG. 1, access assembly 20 is a ladder assembly extending along a longitudinal side of the frame assembly 12. Access assembly 20 is aligned with door 76 such that, when platform 16 is in the lowered position, access assembly 20 facilitates access to the upper surface of platform 16 through opening 74.

Referring still to FIG. 1, lift device 10 includes a human machine interface (HMI), a user interface, a user input device, etc., shown as HMI 102, according to some embodiments. HMI 102 can include any number of buttons, levers, knobs, switches, etc., or any other user input devices configured to receive an input from the operator of lift device 10. HMI 102 can include any number of screens, displays, etc., configured to display imagery, information, data, operational information, etc., regarding lift device 10. In some embodiments, HMI 102 is disposed at platform 16 such that an operator/worker at platform 16 can operate lift device 10. In some embodiments, an additional HMI 102 is disposed at frame assembly 12. In some embodiments, HMI 102 includes a touch screen (e.g., a resistive touch screen, a capacitive touch screen, etc.) configured to display various information to the operator as well as receive user inputs from the operator.

Lift device 10 includes a controller 104, according to some embodiments. Controller 104 is configured to receive sensor information from various sensors of lift device 10, user inputs from any HMIs 102, feedback from any pumps, engines, actuators, etc., of lift device 10, and operate any controllable elements (e.g., operate tractive assemblies 40 to drive lift device 10, operate lift actuators 66 to raise or lower platform 16, etc.) based on any of the sensory inputs, user inputs, etc. In some embodiments, controller 104 is configured to operate HMI 102 to display any received sensory information, operational information, calculated properties, etc., of lift device 10. For example, controller 104 can operate HMI 102 to display a current height (e.g., a current overall length of lift assembly 14) to the operator. Controller 104 can operate any controllable elements of lift device 10 by generating and providing control signals to the controllable elements. Controller 104 can operate HMI 102 (or any other display screens, visual alert devices, aural alert devices, user interfaces, etc.) by generating and providing display/control signals to HMI 102. Controller 104 can be disposed at frame assembly 12 (as shown in FIG. 1), or can be disposed at HMI 102. Controller 104 can be positioned anywhere on lift device 10.

Controller 104 can be configured to determine a maximum allowable height of platform 16 based on any of the sensor information. Controller 104 can receive sensor information from an orientation sensor (e.g., a gyroscope, an accelerometer, etc.), shown as orientation sensor 106. Orientation sensor 106 is configured to measure an orientation of lift device 10. For example, orientation sensor 106 can measure orientation/angulation of lift device 10 about longitudinal axis 32 (e.g., roll angle $\theta_{roll}$), and/or orientation of lift device 10 about lateral axis 30 (e.g., pitch angle $\theta_{pitch}$). Controller 104 can use the roll angle $\theta_{roll}$ and/or the pitch angle $\theta_{pitch}$ to determine a maximum allowable height of platform 16 (e.g., a maximum allowable extension of lift assembly 14). Orientation sensor 106 can include one or more similar orientation sensors. For example, orientation sensor 106 can be disposed at platform 16, at frame assembly 12, etc., or anywhere else on lift device 10.

Orientation sensor 106 can provide controller 104 with real-time orientation information of lift device 10. Controller 104 can operate HMI 102 to display a current height of platform 16 and a current maximum allowable height of platform 16. Advantageously, this facilitates providing the operator with an indication regarding whether or not the maximum allowable height of platform 16 is sufficient to reach the desired work area. Controller 104 can determine the maximum allowable height of platform 16 and restrict lift assembly 14 from raising platform 16 above the maximum allowable height. In some embodiments, controller 104 determines the maximum allowable height of platform 16 in real time, and displays the maximum allowable height to the operator through HMI 102 in real time.

Lift device 10 includes a load sensor, a weight sensor, a strain gauge, etc., shown as load sensor 120. Load sensor 120 is configured to measure a current weight of platform 16. In some embodiments, a load-free weight of platform 16 is known (e.g., a weight of platform 16 without any operators, workers, objects, etc., on platform 16) and the amount of load (e.g., weight due to workers, equipment, tools, etc., being present on platform 16) applied to platform 16 can be determined by controller 104. In some embodiments, controller 104 can receive the measured load/weight from load sensor 120 and determine the maximum allowable height of platform 16 based on the measured load/weight of platform 16. In some embodiments, controller 104 uses the measured load/weight received from load sensor 120 to determine if the current load applied to platform 16 exceeds a maximum load rating (e.g., a maximum allowable load). In some embodiments, controller 104 receives the measured load/weight received from load sensor 120 and displays the current load applied at platform 16 to the operator through HMI 102.

Load sensor 120 can be configured to measure weight of platform 16, or can be configured to measure weight of both platform 16 and lift assembly 14. In some embodiments, load sensor 120 is or includes a collection of load/weight sensors. For example, a first load sensor 120 can be disposed at the connection/coupling between lift assembly 14 and platform 16, while a second load sensor 120 can be disposed at the connection/coupling between lift assembly 14 and frame assembly 12. Load sensor 120 can be positioned anywhere else on lift device 10 such that load sensor 120 can measure weight of operators, equipment, parts, tools, etc., or any other objects or persons on platform 16.

Figure 6:
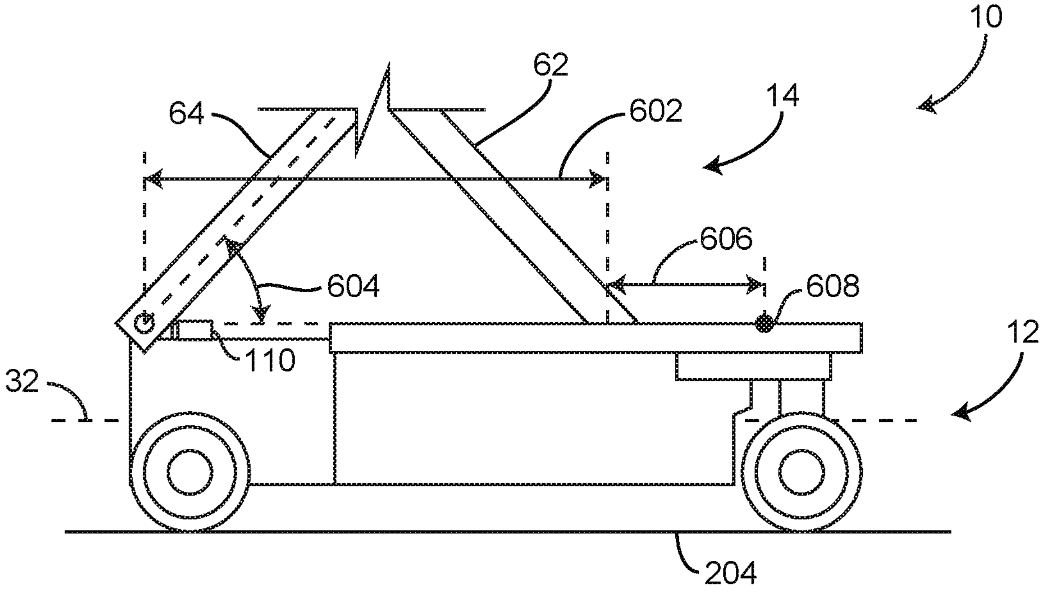
FIG. 6 is a side view of a bottom portion of the lift device of FIG. 1, according to an exemplary embodiment.
Figure 7:
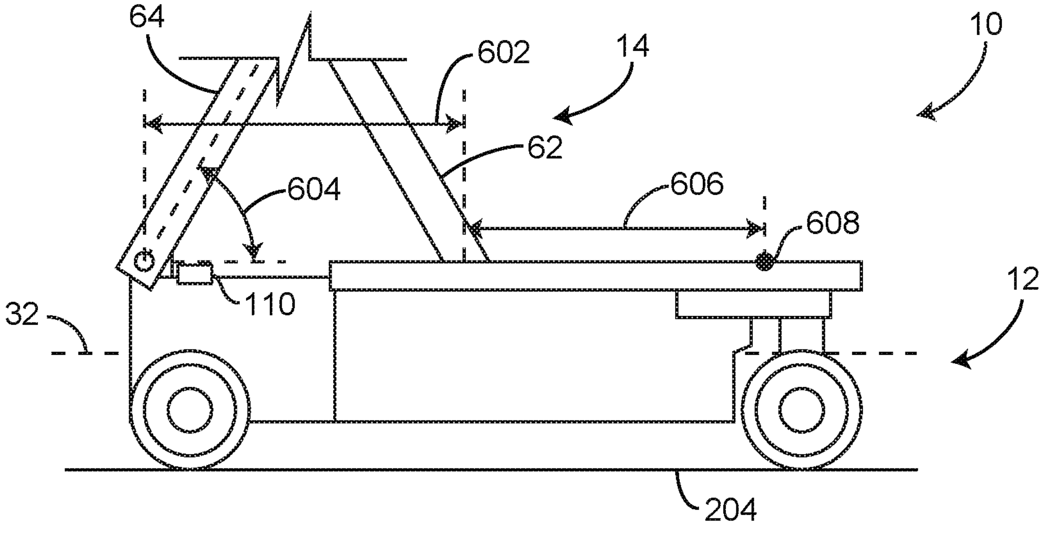
FIG. 7 is a side view of a bottom portion of the lift device of FIG. 1, according to an exemplary embodiment.

Referring now to FIGS. 6 and 7, lift device 10 can include an extension sensor 110. Extension sensor 110 is configured to measure a degree of extension of lift assembly 14 (e.g., an overall height of lift assembly 14) or a value of an angle or distance that is related to the degree of extension of lift assembly 14, and thereby an elevation of platform 16. In some embodiments, extension sensor 110 is configured to measure angle 604 between one of outer member 64 or inner member 62 and an axis parallel with longitudinal axis 32. In some embodiments, angle 604 indicates a degree of extension of lift assembly 14, and thereby an elevation of platform 16. For example, angle 604 may increase as lift assembly 14 raises platform 16, and decrease as lift assembly 14 lowers platform 16. In some embodiments, extension sensor 110 is positioned at the pivotal coupling between one or both of the bottom most outer member 64 or inner member 62 and frame assembly 12. Extension sensor 110 can be a potentiometer, or any other sensor configured to measure angle 604.

Extension sensor 110 can be or include sensor(s) that measure a distance 602 between outer member 64 and inner member 62. In some embodiments, extension sensor 110 is configured to measure a distance between a bottom end of the bottom most outer member 64 and a bottom end of the bottom most inner member 62. For example, extension sensor 110 can be a proximity sensor that measures distance 602 between outer member 64 and inner member 62. In some embodiments, extension sensor 110 is configured to measure distance 602 between outer member 64 and inner member 62 at frame assembly 12 (e.g., at the bottom of lift assembly 14). In other embodiments, extension sensor 110 is or includes an extension sensor 110 configured to measure distance 602 between any corresponding inner member 62 and outer member 64. For example, extension sensor 110 can be configured to measure a distance between corresponding inner member 62 and outer member 64 at an upper end of lift assembly 14. Distance 602 can be any width (e.g., an overall width) of corresponding outer members 64 and inner members 62 along longitudinal axis 32.

In some embodiments, distance 602 is a width of any of scissor layers 60. For example, extension sensor 110 can be configured to measure the width (e.g., distance 602 as shown in FIGS. 2-5) of a bottom most scissor layer 60, an upper most scissor layer 60, an intermediate/medial scissor layer 60, etc. In some embodiments, distance 602 is a distance between a bottom end of bottom most outer member 64 and a bottom end of bottom most inner member 62 (or vice versa). In some embodiments, distance 602 is a distance between a slidable bottom end of inner member 62 and a bottom pivotally coupled end of outer member 64 (or vice versa if the bottom most outer member 64 is slidably coupled with frame assembly 12). In some embodiments, extension sensor 110 is or includes a sensor configured to measure a distance 606 between the slidable one of inner member 62/outer member 64 and a location 608 on frame assembly 12. For example, if inner member 62 is slidably coupled with frame assembly 12 (such that the bottom end of the bottom-most inner member 62 slides along frame assembly 12 as lift assembly 14 elevates platform 16), extension sensor 110 can measure distance 606 between location 608 and the bottom end of the inner member 62. Location 608 may remain stationary relative to the slidable one of inner member 62/outer member 64. Therefore, the change in distance 606 can be related to an extension or retraction of lift assembly 14 and an elevation of platform 16.

In some embodiments, a proximity sensor, a distance sensor, etc., is disposed at a bottom surface, edge, periphery, etc., of platform 16 and is configured to directly measure elevation of platform 16 relative to a ground surface, or relative to a surface of frame assembly 12. For example, the proximity sensor can be or include any of a photoelectric sensor, an ultrasonic sensor, a lidar sensor, an IR distance sensor, etc., or any other sensor configured to measure distance between platform 16 and another surface that remains substantially stationary as platform 16 is raised (e.g., distance 202. In some embodiments, the proximity sensor is configured to provide controller 104 with information regarding the elevation of platform 16.

Figure 4:
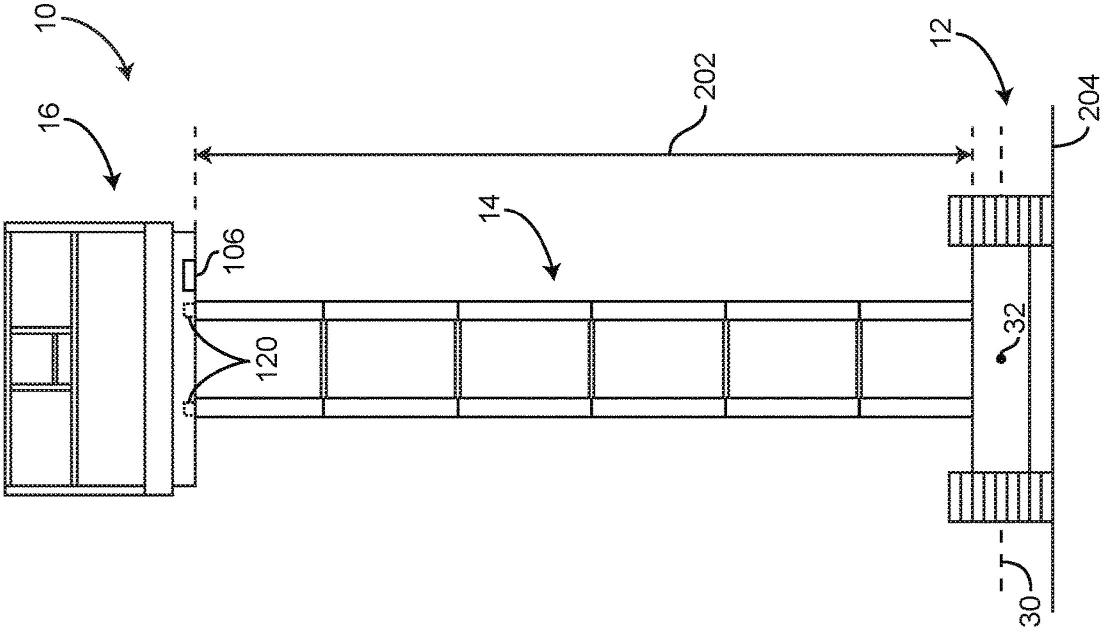
FIG. 4 is a front view of the lift device of FIG. 1, with a roll angle of zero, according to an exemplary embodiment.

Extension sensor 110 provides controller 104 with any of the measured data that indicates a degree of extension or retraction of lift assembly 14. The degree of extension data indicates a current height of platform 16 (e.g., distance 202 as shown in FIG. 4, referred to as variable $h_{platform}$). Controller 104 can use the degree of extension data from extension sensor 110 to determine distance 202 (i.e., $h_{platform}$, a current elevation of platform 16). In other embodiments, controller 104 receives the elevation of platform 16 directly from extension sensor 110 (e.g., if extension sensor 110 is configured to measure distance 202).

Figure 3:
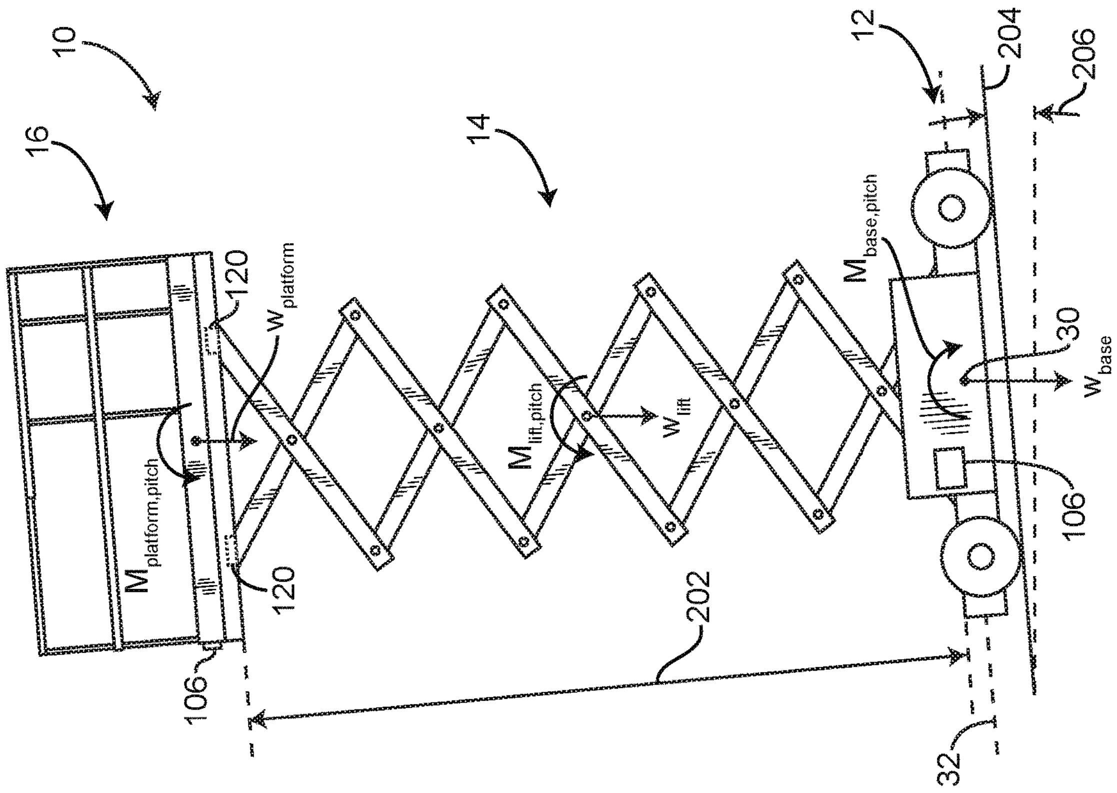
FIG. 3 is a side view of the lift device of FIG. 1, with a non-zero pitch angle, according to an exemplary embodiment.
Figure 2:
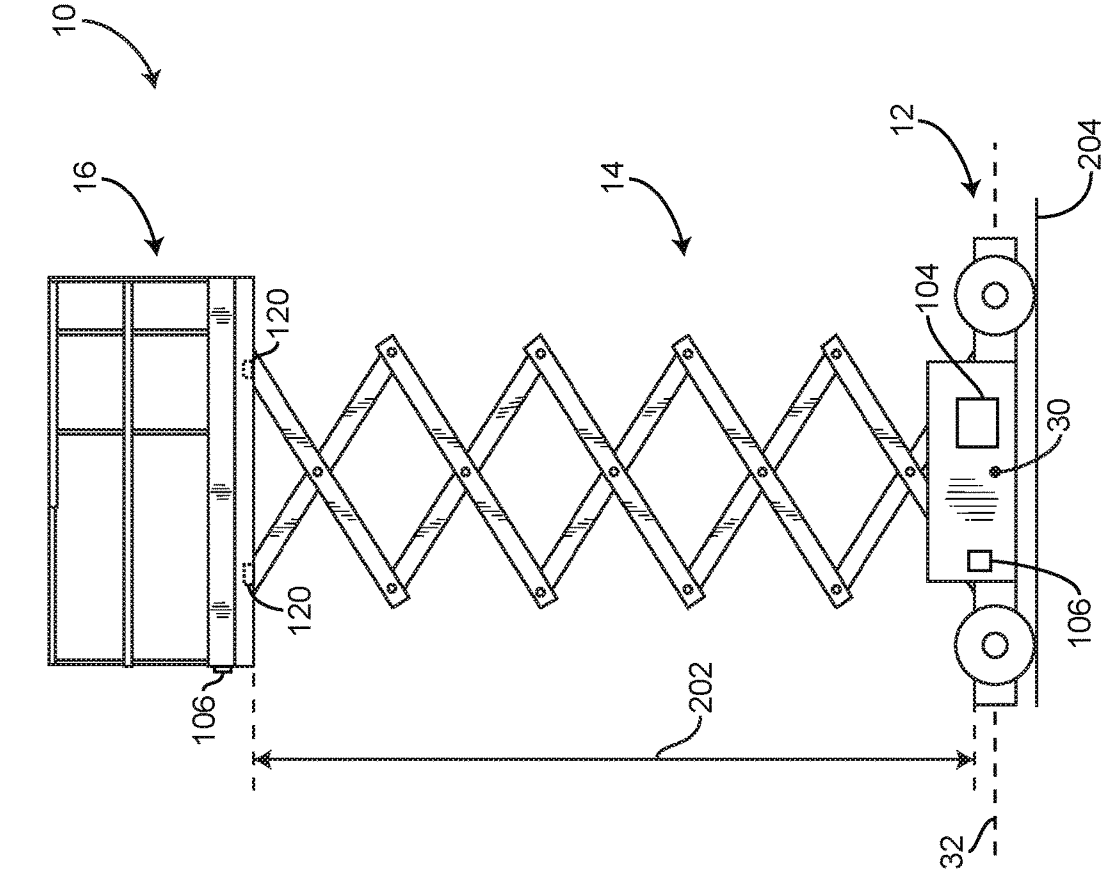
FIG. 2 is a side view of the lift device of FIG. 1 with a pitch angle of zero, according to an exemplary embodiment.

Referring now to FIGS. 2-3, lift device 10 can rest upon a ground surface 204. In some embodiments, ground surface 204 is substantially horizontal, and therefore the pitch angle $\theta_{pitch}$ of lift device 10 as measured by orientation sensor 106 is substantially equal to zero. In other cases, however, ground surface 204 may be angled at pitch angle 206 relative to a horizontal axis. Ground surface 204 may be uneven, sloped, pitched, etc., thereby resulting in pitch angle 206 (i.e., the pitch angle $\theta_{pitch}$) as measured by orientation sensor 106 being greater than or less than zero. For example, FIG. 2 shows lift device 10 at on a substantially level ground surface 204 such that the pitch angle $\theta_{pitch}$ is substantially equal to zero. However, FIG. 3 shows a case when lift device 10 is on a sloped/pitched ground surface 204 such that the pitch angle $\theta_{pitch}$ is a non-zero value.

It should be noted that FIG. 3 is shown for illustrative and explanatory purposes only. Platform 16 may be prevented from extending to the position shown in FIG. 3 when ground surface 204 is pitched as shown. Likewise, FIG. 5 is also for illustrative and explanatory purposes only.

The weight of platform 16 (i.e., $w_{platform}$), the pitch angle $\theta_{pitch}$ (i.e., pitch angle 206), and the extension of lift assembly 14 (e.g., distance 202, or $h_{platform}$) can result in a platform tipping/pitching moment $M_{platform,pitch}$. Likewise, the weight of lift assembly 14 (i.e., $w_{lift}$), the pitch angle $\theta_{pitch}$ (i.e., pitch angle 206) and the extension of lift assembly 14 (e.g., distance 202 or $h_{platform}$) may result in a lift assembly tipping moment $M_{lift,pitch}$. Weight of frame assembly 12 (i.e., $w_{base}$) produces a counter-moment $M_{base,pitch}$ that facilitates preventing lift device 10 from tipping or rolling. The likelihood of tipping/rolling of lift device 10 can be further decreased by limiting the maximum allowable extension of lift assembly 14 (e.g., limiting distance 202 or $h_{platform}$ to $h_{platform,max}$). In some embodiments, controller 104 is configured to determine the maximum allowable extension of lift assembly 14, $h_{platform,max}$, based on the pitch angle $\theta_{pitch}$ to thereby reduce the likelihood of lift device 10 tipping or rolling. In some embodiments, limiting the extension of lift assembly 14 facilitates maintaining $M_{platform,pitch}$ and $M_{lift,pitch}$ below a threshold magnitude. In some embodiments, controller 104 also uses the weight of platform 16, $w_{platform}$ as measured by load sensor 120 to determine the maximum allowable extension of lift assembly 14, $h_{platform,max}$, since the weight of people, equipment, etc., on platform 16 contributes to $M_{platform,pitch}$ and thereby affects the likelihood of lift device 10 tipping.

Figure 5:
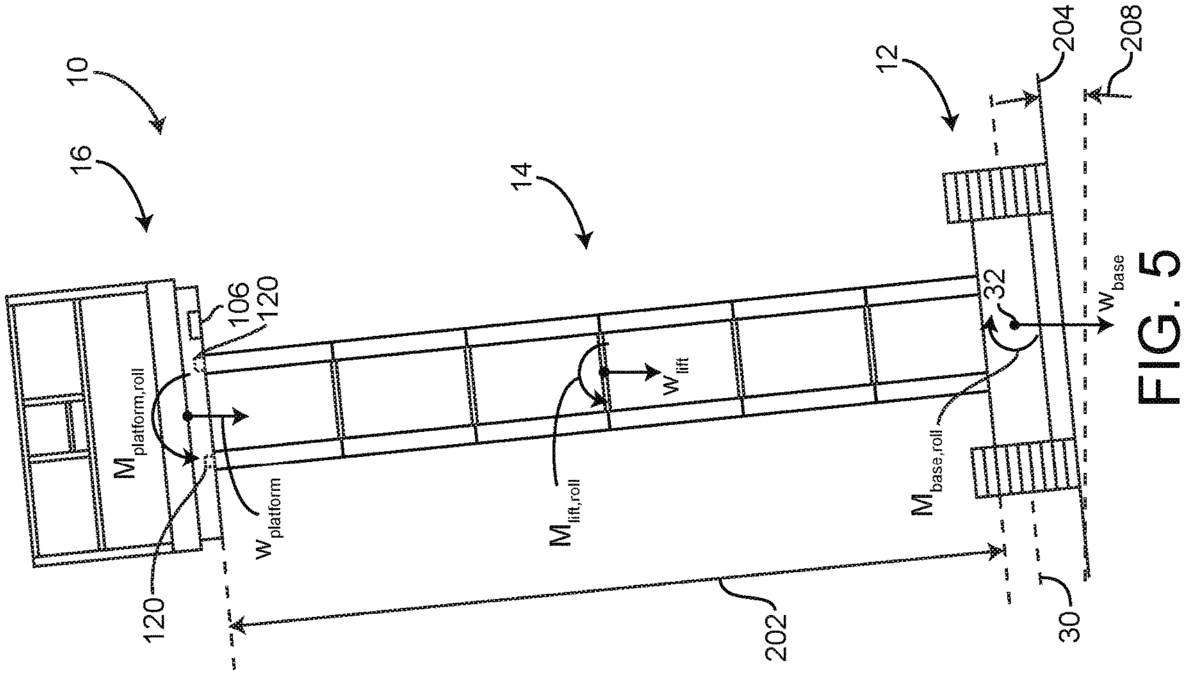
FIG. 5 is a front view of the lift device of FIG. 1, with a non-zero roll angle, according to an exemplary embodiment.

Referring now to FIGS. 4 and 5, ground surface 204 upon which lift device 10 rests can also be substantially horizontal (as shown in FIG. 4) or can be angled at roll angle 208 (i.e., roll angle $\theta_{roll}$) relative to a horizontal axis. If ground surface 204 is angled or uneven (e.g., due to sloped, pitched, angled, uneven terrain, etc.) and the roll angle $\theta_{roll}$ is a value greater than or less than zero, the weight of platform 16, $w_{platform}$, can produce a platform roll moment $M_{platform,roll}$. Likewise, the weight of lift assembly $w_{lift}$ may produce a lift assembly roll moment $M_{lift,roll}$. The platform roll moment $M_{platform,roll}$ and the lift assembly roll moment $M_{lift,roll}$ can be related to the degree of extension of lift assembly 14 (e.g., related to distance 202). As lift assembly 14 extends (e.g., distance 202 increases), the platform roll moment $M_{platform,roll}$ and the lift assembly roll moment $M_{lift,roll}$ may increase. The weight of frame assembly 12 $w_{base}$ produces a counter moment $M_{base,roll}$ that opposes the platform roll moment $M_{platform,roll}$ and thereby facilitates reducing the likelihood of lift device 10 rolling.

In some embodiments, the magnitude of the platform roll moment $M_{platform,roll}$ and the magnitude of the lift assembly roll moment $M_{lift,roll}$ are related to the degree of extension of lift assembly 14 (e.g., related to $h_{platform}$ or distance 202). In some embodiments, controller 104 is configured to determine the maximum allowable extension of lift assembly 14, $h_{platform,max}$ based on the roll angle $\theta_{roll}$ (i.e., roll angle 208). In some embodiments, controller 104 is configured to determine the maximum allowable extension of lift assembly 14 $h_{platform,max}$ to facilitate preventing the magnitude of the platform roll moment $M_{platform,roll}$ and the magnitude of the lift assembly roll moment $M_{lift,roll}$ from exceeding a threshold value, thereby decreasing the likelihood of lift device 10 rolling.

In some embodiments, controller 104 uses both the roll angle $\theta_{roll}$ and the weight of platform 16, $w_{platform}$, to determine the maximum allowable extension of lift assembly 14 $h_{platform,max}$. In some embodiments, the weight of platform 16, $w_{platform}$, is measured directly by or determined based on measurements of load sensor 120. Controller 104 can use the measurements of load sensor 120 to determine the weight of platform 16, $w_{platform}$. In some embodiments, controller 104 limits the extension of lift assembly 14 based on the weight of platform 16, $w_{platform}$.

Figure 8:
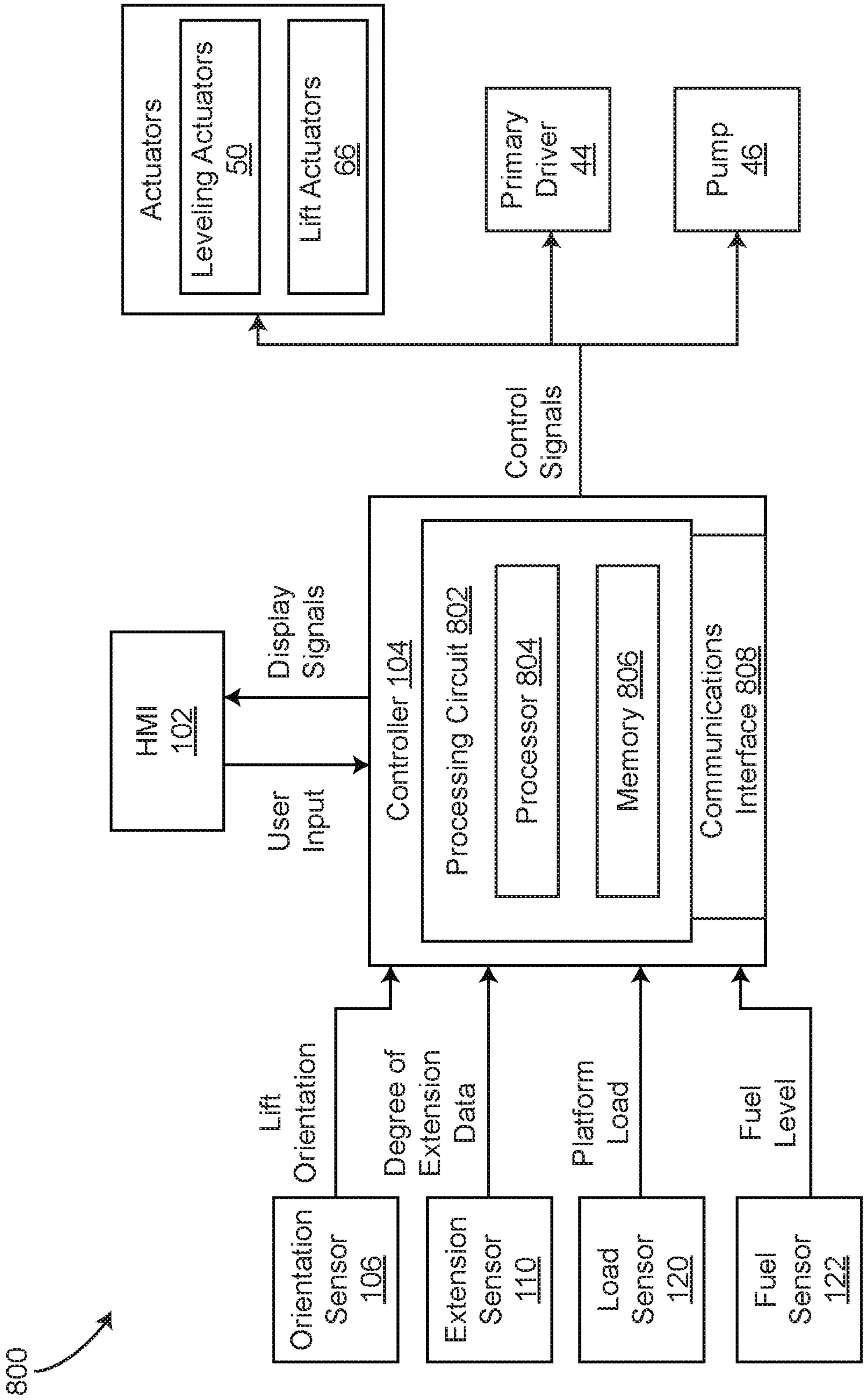
FIG. 8 is a block diagram of a control system that can be used to operate the lift device of FIG. 1, according to an exemplary embodiment.

Referring now to FIG. 8, a control system 800 for lift device 10 includes controller 104, HMI 102, orientation sensor 106, extension sensor 110, load sensor 120, and a fuel sensor 122. Control system 800 can be used to operate lift device 10. Controller 104 receives lift orientation data from orientation sensor 106. In some embodiments, the lift orientation data includes real-time values of both the pitch angle $\theta_{pitch}$ and the roll angle $\theta_{roll}$. In some embodiments, controller 104 receives real-time values of both the pitch angle $\theta_{pitch}$ and the roll angle $\theta_{roll}$ from orientation sensor 106 or a collection of orientation sensors 106. In some embodiments, controller 104 receives degree of extension data from extension sensor 110. In some embodiments, the degree of extension data includes any of a value of angle 604, value of distance 602, value of distance 606, etc., or any other angle values, distance values, etc., of lift assembly 14 that extension sensor 110 is configured to measure and that can be used to determine a degree of extension of lift assembly 14. In some embodiments, controller 104 is configured to use the degree of extension data received from extension sensor 110 to determine a current elevation of platform 16 (e.g., to determine a current value of distance 202, $h_{platform}$). In some embodiments, extension sensor 110 is configured to directly measure the current elevation of platform 16 (e.g., $h_{platform}$ or distance 202) and provides the measured elevation/height of platform 16 to controller 104.

Controller 104 also receives a measured weight of platform 16, $w_{platform}$, from load sensor 120, according to some embodiments. In some embodiments, controller 104 uses the weight of platform 16, $w_{platform}$, as measured by load sensor 120 (or a collection of load sensors 120) to determine a load that is applied at platform 16. In some embodiments, controller 104 determines the load applied at platform 16, $w_{load}$ using the equation: $w_{load}=w_{platform}-w_{platform,no\ load}$ where $w_{load}$ is the determined weight of equipment, workers, tools, etc., on platform 16, $w_{platform}$ is the weight measured by load sensor 120, and $w_{platform,no\ load}$ is the weight of platform 16 without any load (e.g., without any objects, workers, equipment, etc.).

Controller 104 can also receive a fuel level from fuel sensor 122. In some embodiments, the fuel level received from fuel sensor 122 indicates a remaining quantity or percentage of fuel used by primary driver 44. In some embodiments, controller 104 is configured to operate HMI 102 to display a current fuel level of lift device 10. Controller 104 can receive information from any other sensors, systems, devices, actuators, etc., of lift device 10. Controller 104 can operate HMI 102 to display any of the received sensor information to the operator of lift device 10.

In some embodiments, controller 104 is configured to receive a user input from HMI 102. The user input received from HMI 102 can include any of a command to operate lift assembly 14 (e.g., to raise or lower platform 16 by operating lift actuators 66), to drive or steer lift device 10 (e.g., to operate primary driver 44 to rotate/drive tractive assemblies 40), etc., or to otherwise operate lift device 10. In some embodiments, controller 104 is configured to generate and provide control signals to any controllable elements of lift device 10 to perform the requested operations indicated by the user input received from HMI 102.

Controller 104 is configured to generate and provide control signals (e.g., display signals) to HMI 102 to operate HMI 102. The display signals can be provided to HMI 102 to cause HMI 102 to display various imagery, notifications, visual alerts, aural alerts, etc., described herein. Controller 104 can generate and provide display signals to HMI 102 in response to receiving a user input from HMI 102, in response to determining a value (e.g., determining the maximum allowable height of platform 16), etc., as described herein.

Controller 104 can include a communications interface 808. Communications interface 808 may facilitate communications between controller 104 and external systems, devices, sensors, etc. (e.g., orientation sensor 106, extension sensor 110, load sensor 120, fuel sensor 122, leveling actuators 50, lift actuators 66, HMI 102, etc.) for control, monitoring, adjustment to any of the communicably connected devices, displays, sensors, systems, primary movers, etc. Communications interface 808 may also facilitate communications between controller 104 and HMI 102 (e.g., a touch screen, a display screen, a personal computer, etc.) or with a network.

Communications interface 808 can be or include wired or wireless communications interfaces (e.g., jacks, antennas, transmitters, receivers, transceivers, wire terminals, etc.) for conducting data communications with sensors, devices, systems, etc., of lift device 10 or other external systems or devices (e.g., an administrative device). In various embodiments, communications via communications interface 808 can be direct (e.g., local wired or wireless communications) or via a communications network (e.g., a WAN, the Internet, a cellular network, etc.). For example, communications interface 808 can include an Ethernet card and port for sending and receiving data via an Ethernet-based communications link or network. In another example, the communications interface can include a Wi-Fi transceiver for communicating via a wireless communications network. In some embodiments, communications interface 808 is or includes a power line communications interface. In other embodiments, communications interface 808 is or includes an Ethernet interface, a USB interface, a serial communications interface, a parallel communications interface, etc.

Controller 104 includes a processing circuit 802, a processor 804, and memory 806. Processing circuit 802 can be communicably connected to communications interface 808 such that processing circuit 802 and the various components thereof can send and receive data via communications interface 808. Processor 804 can be implemented as a general purpose processor, an application specific integrated circuit (ASIC), one or more field programmable gate arrays (FPGAs), a group of processing components, or other suitable electronic processing components.

Memory 806 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 806 can be or include volatile memory or non-volatile memory. Memory 806 can include database components, object code components, script components, or any other type of information structure for supporting the various activities and information structures described in the present application. According to some embodiments, memory 806 is communicably connected to processor 804 via processing circuit 802 and includes computer code for executing (e.g., by processing circuit 802 and/or processor 804) one or more processes described herein.

In some embodiments, controller 104 is configured to monitor fore-aft and/or side-to-side angle/orientation of lift device 10 (e.g., $\theta_{pitch}$ and/or $\theta_{roll}$) and restrict operation of lift assembly 14 based on the fore-aft and/or side-to-side angle/orientation of lift device 10. In some embodiments, controller 104 restricts operation of lift assembly 14 (e.g., restricts elevating/raising platform 16) in response to one or both of $\theta_{pitch}$ and/or $\theta_{roll}$ exceeding an associated threshold value. In some embodiments, controller 104 determines a value of the maximum allowable height of platform 16, $h_{platform,max}$ based on the pitch angle $\theta_{pitch}$. For example, controller 104 can determine the value of the maximum allowable height of platform 16 using:

$$h_{platform,max}=f(\theta_{pitch})$$

where $h_{platform,max}$ is the maximum allowable height of platform 16 (or the maximum allowable amount of extension of lift assembly 14), $\theta_{pitch}$ is the pitch angle of lift device 10 (e.g., pitch angle 206), and $f$ is a function that relates $h_{platform,max}$ to $\theta_{pitch}$.

In some embodiments, controller 104 uses both the pitch angle, $\theta_{pitch}$, of lift device 10 and the load, $w_{load}$ applied at platform 16 to determine the maximum allowable elevation of platform 16, $h_{platform,max}$. For example, controller 104 can determine the maximum allowable height of platform 16 using:

$$h_{platform,max}=f(\theta_{pitch},w_{load})$$

where $h_{platform,max}$ is the maximum allowable height of platform 16, $\theta_{pitch}$ is the pitch angle of lift device 10 (e.g., pitch angle 206), $w_{load}$ is the load applied at platform 16, and $f$ is a function that relates $h_{platform,max}$ to both $\theta_{pitch}$ and $w_{load}$.

In some embodiments, controller 104 can determine the value of the maximum allowable height of platform 16 using:

$$h_{platform,max}=f(\theta_{roll})$$

where $h_{platform,max}$ is the maximum allowable height of platform 16 (or the maximum allowable amount of extension of lift assembly 14), $\theta_{roll}$ is the roll angle of lift device 10 (e.g., roll angle 208), and $f$ is a function that relates $h_{platform,max}$ to $\theta_{pitch}$.

In some embodiments, controller 104 uses both the roll angle, $\theta_{roll}$, of lift device 10 and the load, $w_{load}$ applied at platform 16 to determine the maximum allowable elevation of platform 16, $h_{platform,max}$. For example, controller 104 can determine the maximum allowable height of platform 16 using:

$$h_{platform,max}=f(\theta_{roll},w_{load})$$

where $h_{platform,max}$ is the maximum allowable height of platform 16, $\theta_{roll}$ is the roll angle of lift device 10 (e.g., roll angle 208), $w_{load}$ is the load applied at platform 16, and $f$ is a function that relates $h_{platform,max}$ to both $\theta_{roll}$ and $w_{load}$.

In some embodiments, controller 104 uses both the roll angle $\theta_{roll}$ and the pitch angle $\theta_{pitch}$ of lift device 10 to determine the maximum allowable height $h_{platform,max}$ of platform 16. In some embodiments, controller 104 uses:

$$h_{platform,max}=f(\theta_{roll},\theta_{pitch})$$

where $h_{platform,max}$ is the maximum allowable height of platform 16, $\theta_{pitch}$ is the pitch angle of lift device 10, $\theta_{roll}$ is the roll angle of lift device 10, and $f$ is a function that relates $h_{platform,max}$ to both $\theta_{pitch}$ and $\theta_{roll}$. In some embodiments, the function $f$ is any of a linear function, a non-linear function (e.g., a polynomial), a function generated from a regression of empirical data, a function determined based on one or more moment/torque diagrams of lift device 10, etc. In some embodiments, the function $f$ is different for various models of lift device 10 that have different weights $w_{base}$ of frame assembly 12. For example, if additional weight is added to frame assembly 12, controller 104 may determine a larger value of $h_{platform,max\ when}$ compared to a frame assembly 12 with less weight (e.g., a lower value of $w_{base}$).

In some embodiments, controller 104 uses the roll angle $\theta_{roll}$ and the pitch angle $\theta_{pitch}$ of lift device 10 in addition to the load at platform 16 (i.e., $w_{load}$) or in addition to the weight of platform 16 (i.e., $w_{platform}$ as measured by load sensor 120) to determine the maximum allowable height of platform 16. For example, controller 104 can use:

$$h_{platform,max}=f(\theta_{roll},\theta_{pitch},w)$$

to determine $h_{platform,max}$, where $\theta_{roll}$ is the roll angle of lift device 10, $\theta_{pitch}$ is the pitch angle of lift device 10, w is $w_{load}$ or $w_{platform}$, and $f$ is a function that relates $h_{platform,max}$ to $\theta_{pitch}$, $\theta_{roll}$, and w. In some embodiments, the function $f$ is any of a linear function, a non-linear function (e.g., a polynomial), a function generated from a regression of empirical data, a function determined based on one or more moment/torque diagrams of lift device 10, etc. In some embodiments, the function $f$ is different for various models of lift device 10 that have different weights $w_{base}$ of frame assembly 12. For example, if additional weight is added to frame assembly 12, controller 104 may determine a larger value of $h_{platform,max}$ when compared to a frame assembly 12 with less weight (e.g., a lower value of $w_{base}$).

In some embodiments, controller 104 is configured to determine the maximum allowable height $h_{platform,max}$ of platform 16 that maintains one or more (or all) of the platform pitch moment $M_{platform,pitch}$, the lift assembly pitch moment $M_{lift,pitch}$, the platform roll moment $M_{platform,roll}$, and the lift assembly roll moment $M_{lift,roll}$ less than a predetermined threshold value $M_{threshold}$. The predetermined threshold value $M_{threshold}$ can be a maximum allowable moment $M_{max}$. In some embodiments, the predetermined threshold value is a difference between any of the platform pitch moment $M_{platform,pitch}$, the lift assembly pitch moment $M_{lift,pitch}$, the platform roll moment $M_{platform,roll}$, and the lift assembly roll moment $M_{lift,roll}$, and the maximum allowable moment $M_{max}$ (e.g., $M_{threshold}=M_{max}-M_{platform,roll}$). In some embodiments, controller 104 determines the maximum allowable height $h_{platform,max}$ based on the pitch angle $\theta_{pitch}$ and/or the roll angle $\theta_{roll}$ such that a factor of safety is maintained. For example, the maximum allowable height $h_{platform,max}$ of platform 16 may be a height value corresponding to an overall pitch or roll moment of lift device 10 being less than a maximum allowable pitch or roll moment of lift device 10 by some predetermined amount (e.g., a predetermined quantity, a predetermined percentage, one standard deviation, etc.).

Figure 9:
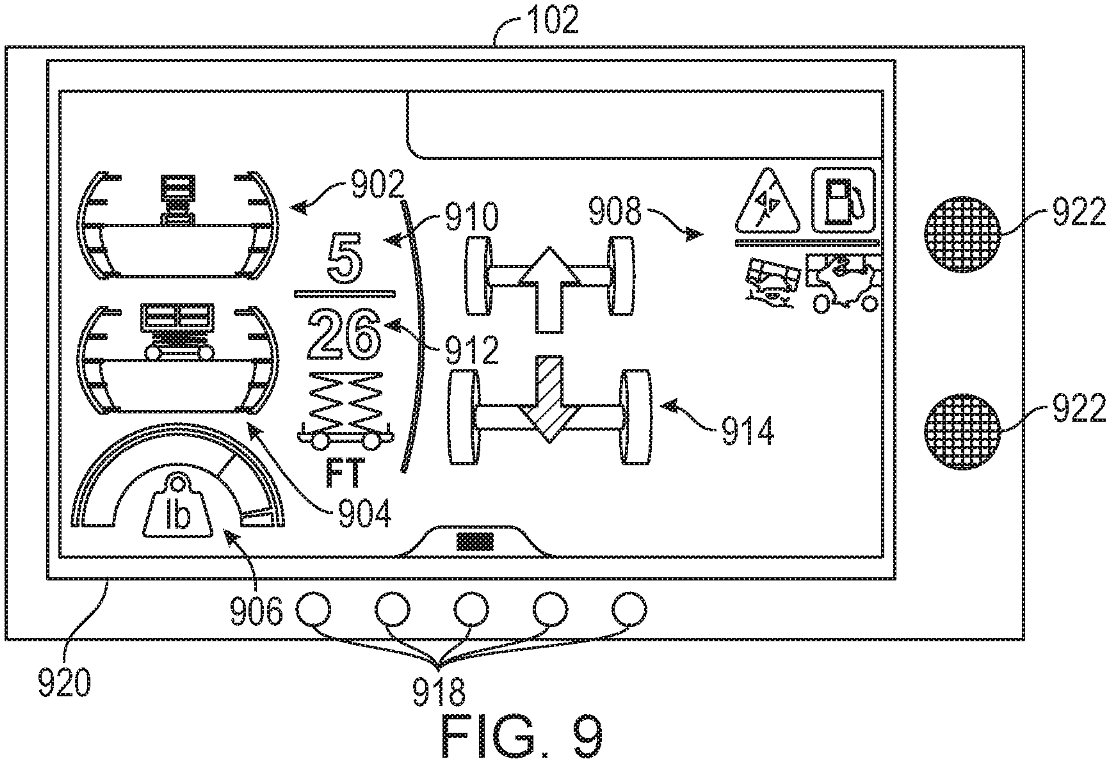
FIG. 9 is a graphical user interface that can be provided to an operator of the lift device of FIG. 1, according to an exemplary embodiment.
Figure 10:
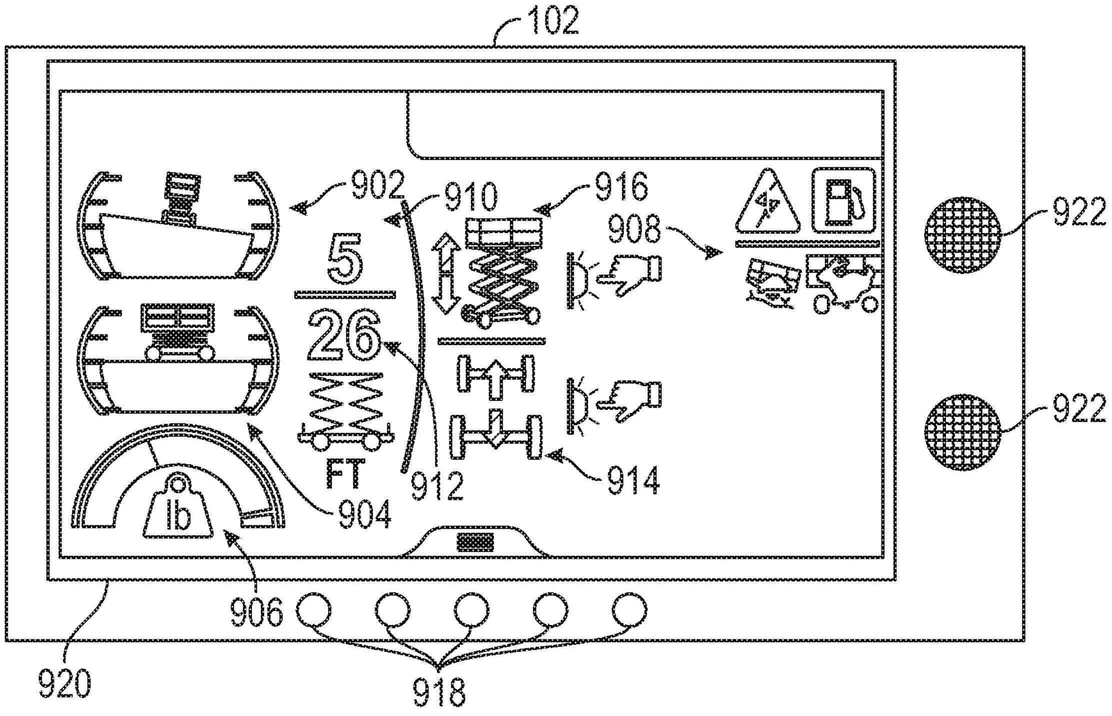
FIG. 10 is a graphical user interface that can be provided to an operator of the lift device of FIG. 1, according to an exemplary embodiment.

Controller 104 can determine the maximum allowable height of platform 16, $h_{platform,max}$, and operate HMI 102 to provide/display the maximum allowable height of platform 16, $h_{platform,max}$, to the operator (see FIGS. 9 and 10). Advantageously, this facilitates notifying the operator if the operator can reach a required work elevation given the current slope, pitch, roll, etc., of lift device 10. The operator advantageously knows the maximum allowable height/reach of lift assembly 14 before operating lift assembly 14.

In some embodiments, platform 16 has a maximum possible elevation, $h_{platform,reach}$ due to the configuration and reach (e.g., maximum possible overall length) of lift assembly 14. For example, certain lift assemblies may be taller than others, or include more scissor layers 60, thereby facilitating a longer reach of platform 16 (e.g., a larger value of $h_{platform,reach}$. In some embodiments, controller 104 compares the maximum allowable height $h_{platform,max}$ of platform 16 to the maximum possible elevation $h_{platform,reach}$, given the configuration and construction of lift assembly 14 (and the overall size of lift device 10). For example, if lift device 10 is on level ground (i.e., the pitch angle $\theta_{pitch}$ and the roll angle $\theta_{roll}$ are substantially zero), the maximum allowable height $h_{platform,max}$ of platform 16 is substantially equal to the maximum possible elevation/reach $h_{platform,reach}$ of platform 16. In some embodiments, if $h_{platform,max}=h_{platform,reach}$, controller 104 operates HMI 102 to display the maximum allowable height $h_{platform,reach}$ of platform 16 to the user in a green color (e.g., allowable height information 912 is displayed in a green color). However, if the ground that lift device 10 rests upon is pitched/sloped (e.g., the pitch angle $\theta_{pitch}$ and/or the roll angle $\theta_{roll}$ are non-zero), the maximum allowable height $h_{platform,max}$ of platform 16 is less than the maximum possible elevation/reach $h_{platform,reach}$ of platform 16. In some embodiments, if $h_{platform,max}<h_{platform,reach}$, controller 104 operates HMI 102 to display the maximum allowable height $h_{platform,max}$ of platform 16 in a yellow color (e.g., allowable height information 912 is displayed in a yellow color). In this way, an operator can be advantageously notified if the current slope/pitch of the ground surface that lift device 10 is resting upon results in the maximum allowable height $h_{platform,max}$ of platform 16 being less than the maximum possible elevation/reach $h_{platform,reach}$.

Controller 104 can also operate HMI 102 to display the current height of platform 16, $h_{platform}$ to the operator. In some embodiments, controller 104 operates HMI 102 to display both the current height of platform 16, $h_{platform}$, and the maximum allowable height of platform 16, $h_{platform,max}$.

Controller 104 can track/monitor the current height of platform 16, $h_{platform}$, and generate control signals for lift actuators 66 to elevate platform 16, provided the current height of platform 16 is less than the maximum allowable height of platform 16. However, once the current height of platform 16 is substantially equal to the maximum allowable height of platform 16 (e.g., once $h_{platform}=h_{platform,max}$), controller 104 can restrict continued elevation of platform 16. For example, controller 104 can be configured to only provide control signals to lift actuators 66 (control signals that operate lift actuators 66 to extend lift assembly 14) if $h_{platform}<h_{platform,max}$. Controller 104 continuously monitors the current height of platform 16 as lift assembly 14 is operated and restricts further elevation of platform 16 once $h_{platform}=h_{platform,max}$. In some embodiments, controller 104 only restricts operation of lift assembly 14 that would cause platform 16 to elevate further if $h_{platform}=h_{platform,max}$. For example, if platform 16 is substantially at the maximum allowable height (as determined by controller 104), and the operator provides an input to HMI 102 to elevate platform 16 further, controller 104 can restrict lift actuators 66 from operating lift assembly 14 to extend. However, if platform 16 is substantially at the maximum allowable height, controller 104 can allow the user to operate lift assembly 14 such that platform 16 is lowered (e.g., lift assembly 14 is retracted).

In some embodiments, controller 104 restricts driving operations of lift device 10 if platform 16 is at the maximum allowable height (e.g., $h_{platform}=h_{platform,max}$). Advantageously, this can reduce the likelihood of the operator driving lift device 10 onto a more inclined surface (e.g., onto a surface that results in a greater value of $\theta_{pitch}$ and/or $\theta_{roll}$).

In some embodiments, controller 104 monitors the pitch angle $\theta_{pitch}$ and/or the roll angle $\theta_{roll}$ of lift device 10 over time. In some embodiments, controller 104 determines a rate of change of the pitch angle $\dot{\theta}_{pitch}$ and/or a rate of change of the roll angle $\dot{\theta}_{roll}$. Controller 104 can operate lift assembly 14 to maintain platform 16 at or below the maximum allowable height of platform 16 over time. For example, if an operator controls lift assembly 14 such that platform 16 is at the maximum allowable height and then operates lift device 10 to drive, controller 104 can lower platform 16 by operating lift assembly 14 over time. For example, if the operator drives lift device 10 up a hill, and the pitch angle $\theta_{pitch}$ and/or the roll angle $\theta_{roll}$ increase (thereby decreasing the maximum allowable height $h_{platform,max}$), controller 104 can operate lift assembly 14 to lower platform 16 such that platform 16 maintains a height that is less than or equal to the maximum allowable height $h_{platform,max}$ as the operator drives lift device 10. If a magnitude of the pitch angle $\theta_{pitch}$ and/or a magnitude of the roll angle $\theta_{roll}$ exceed a predetermined threshold value or if a magnitude of the rate of change of the pitch angle $\dot{\theta}_{pitch}$ and/or a magnitude the rate of change of the roll angle $\theta_{roll}$ exceed predetermined threshold values (indicating that the operator is driving lift device 10 up a steep incline or down a steep incline), controller 104 can restrict driving/steering functions of lift device 10.

In some embodiments, controller 104 limits a speed at which lift device 10 can be driven such that controller 104 can operate lift assembly 14 to maintain platform 16 at or below the maximum allowable height $h_{platform,max}$.

In some embodiments, controller 104 is configured to operate HMI 102 to provide a visual and/or aural alert to the operator if platform 16 is near or at the maximum allowable height. For example, if platform 16 is 90% of the way to the maximum allowable height (e.g., $h_{platform}=0.9\cdot h_{platform,max}$), controller 104 can operate HMI 102 to provide a visual alert (e.g., changing the color of emitted light, providing a notification, changing the color of text displayed to the operator, etc.) and/or an aural alert (e.g., a warning noise) to the operator. In some embodiments, controller 104 operates HMI 102 to display varying degrees of visual and/or aural alerts to the operator based on a difference between the height platform 16 and the maximum allowable height of platform 16 (e.g., $\Delta h=h_{platform,max}-h_{platform}$). For example, once platform 16 is 50% of the way to the maximum allowable height, controller 104 may operate HMI 102 to provide a first visual and/or first aural alert, once platform 16 is 80% of the way to the maximum allowable height, controller 104 may operate HMI 102 to provide a second visual and/or second aural alert, once platform 16 is 90% of the way to the maximum allowable height, controller 104 may operate HMI 102 to provide a third visual and/or third aural alert, etc.

In some embodiments, controller 104 operates HMI 102 to provide varying degrees of alert to the operator. For example, controller 104 may operate HMI 102 to provide only a visual alert when platform 16 is within a first range of the maximum allowable height, and both a visual and an aural alert when platform 16 is substantially at the maximum allowable height. In some embodiments, if platform 16 is at the maximum allowable height, and the operator inputs a command to elevate/raise platform 16 further, controller 104 provides a visual and/or an aural alert to the operator and restricts operation of lift assembly 14 to elevate/raise platform 16 (e.g., controller 104 operates HMI 102 to produce a buzzing noise, and flash a light, provide a warning notification "MAX ALLOWABLE HEIGHT REACHED," etc.).

In some embodiments, controller 104 operates levelling actuators 50 based on the pitch angle $\theta_{pitch}$ of lift device 10 and/or the roll angle $\theta_{roll}$ of lift device 10. For example, controller 104 can operate leveling actuators 50 to drive the pitch angle $\theta_{pitch}$ and/or the roll angle $\theta_{roll}$ of lift device 10 towards zero, thereby leveling lift device 10. In this way, controller 104 can use the measurements from orientation sensor 106 to facilitate leveling lift device 10, and thereby increasing the maximum allowable height $\theta_{platform,max}$.

Advantageously, control system 800 facilitates preventing lift device 10 from tipping or rolling. Controller 104 advantageously determines a maximum allowable height of platform 16 and can restrict, or slow elevation of lift assembly 14 based on the maximum allowable height of platform 16. For example, controller 104 can limit the speed at which platform 16 can be elevated. The speed/rate at which platform 16 can be elevated/raised may decrease (e.g., linearly, non-linearly, etc.) as platform 16 approaches the maximum allowable height $h_{platform,max}$. Once platform 16 reaches the maximum allowable height $h_{platform,max}$, the speed/rate of the elevation/raising of platform 16 is zero (e.g., platform 16 is restricted from being elevated/raised above the maximum allowable height $h_{platform,max}$).

Referring now to FIGS. 9 and 10, various display screens, graphical user interfaces, images, visual notifications, etc., of HMI 102 are shown, according to some embodiments. In some embodiments, controller 104 is configured to generate display signals and provide the display signal to HMI 102 to operate HMI 102 to display any of the information, images, graphical interfaces, etc., as shown in FIGS. 9 and 10 or described throughout the present disclosure.

FIG. 9 shows a first graphical user interface that HMI 102 can be configured to display. In some embodiments, HMI 102 includes a display device, a screen, a display screen, a monitor, a computer screen, an LED display, an LCD display, etc., or any other display device, shown as display 920. Display 920 is configured to provide visual alerts, imagery, graphical images, notifications, etc., to the operator of lift device 10. Display 920 can be a touch screen, configured to both provide visual imagery/notifications to the operator as well as receive user inputs from the operator.

HMI 102 can include one or more aural alert devices, shown as speakers 922. Speakers 922 are configured to be operated by controller 104 and can provide an aural alert (e.g., a buzzing noise, a siren noise, beeping noises, tones, etc.) to the operator.

HMI 102 can include any number of buttons, input devices, levers, switches, joysticks, etc., shown as buttons 918. Buttons 918 can be configured to operate display 920 (e.g., to show different display screens, to show different imagery, etc.), or to operate lift device 10. HMI 102 can receive inputs via buttons 918 and/or display 920, and provide the user inputs to controller 104.

Referring to FIGS. 9 and 10, display 920 of HMI 102 can display a graphical roll image 902, a graphical pitch image 904, load information 906, direction of travel information 914, current platform height information 910, and maximum allowable height information 912. In some embodiments, current platform height information 910 is the current height $h_{platform}$ of platform 16. In some embodiments, maximum allowable height information 912 is the maximum allowable height $h_{platform,max}$ of platform 16. Graphical roll image 902 indicates a current value of $\theta_{roll}$. Graphical roll image 902 can include a visual representation of lift device 10 and a visual representation of ground surface 204. Likewise, graphical pitch image 904 indicates a current value of $\theta_{pitch}$ and can include a visual representation of lift device 10 and a visual representation of ground surface 204. In some embodiments, if the values of $\theta_{roll}$ and $\theta_{pitch}$ are within an acceptable range or are substantially equal to zero, graphical roll image 902 and graphical pitch image 904 are green-colored. If the values of $\theta_{roll}$ and $\theta_{pitch}$ are within an acceptable but non-ideal range (e.g., values of $\theta_{roll}$ and/or $\theta_{pitch}$ that significantly affect the maximum allowable height of platform 16), graphical roll image 902 and/or graphical pitch image 904 can be displayed as yellow-colored images. If the values of $\theta_{roll}$ and/or $\theta_{pitch}$ are outside of an acceptable range (e.g., exceed a corresponding threshold), graphical roll image 902 and/or graphical pitch image 904 can be displayed as red-colored.

In some embodiments, load information 906 includes a value of the weight applied to platform 16. For example, load information 906 can include the value of $w_{platform}$ (as measured by load sensor 120) and/or the value of $w_{load}$ (as determined by controller 104). The weight value displayed by load information 906 can be a current weight value. In some embodiments, load information 906 includes a gauge (e.g., a bar, an arcuate bar, etc.) that indicates the weight applied at platform 16. In some embodiments, the color of the gauge is green if the weight applied at platform 16 is within an acceptable range. In some embodiments, the color of the gauge is red if the weight applied at platform 16 is outside of the acceptable range (e.g., above maximum rating or a corresponding threshold weight of lift device 10). In some embodiments, the color of the gauge is yellow if the weight applied at platform 16 is near (e.g., within a predetermined percentage, within a predetermined amount) of a maximum allowable weight of platform 16.

Any of graphical roll image 902, graphical pitch image 904, load information 906, etc., can be displayed in a green color if their respective values (e.g., the roll angle, the pitch angle, etc.) are currently at an acceptable value. If the respective values of graphical roll image 902, graphical pitch image 904, load information 906, etc., is not an acceptable value, the images may be displayed in a red color. Likewise, if the respective values of any of graphical roll image 902, graphical pitch image 904, load information 906, etc., result in a maximum allowable height of platform 16 that is less than a maximum possible reach of lift assembly 14, the colors of the images can be displayed in yellow.

In some embodiments, direction of travel information 914 includes a graphical representation of tractive assemblies 40 of lift device 10, and an indication (e.g., an arrow) regarding a current direction of travel of lift device 10. In some embodiments, display 920 is also configured to display a graphical representation 916 of a direction of operation of lift assembly 14. For example, graphical representation 916 can include an icon that shows a representation of lift device 10 and a current direction of travel of platform 16 (e.g., an upwards pointing arrow, a downwards pointing arrow, etc.).

In some embodiments, display 920 is configured to display various operational notifications 908 to the operator. For example, operational notifications 908 can include a low fuel alert, a mode of operation notification (e.g., throttle position, slow or fast), a maintenance required alert, etc. Any of operational notifications 908 can be provided based on sensory information received by controller 104.

In some embodiments, HMI 102 includes one or more alert lights, light emitting devices, light emitting diodes, etc., for providing any of the visual alerts described herein. Likewise, speakers 922 can be configured to provide any of the aural alerts described herein.

Figure 11:
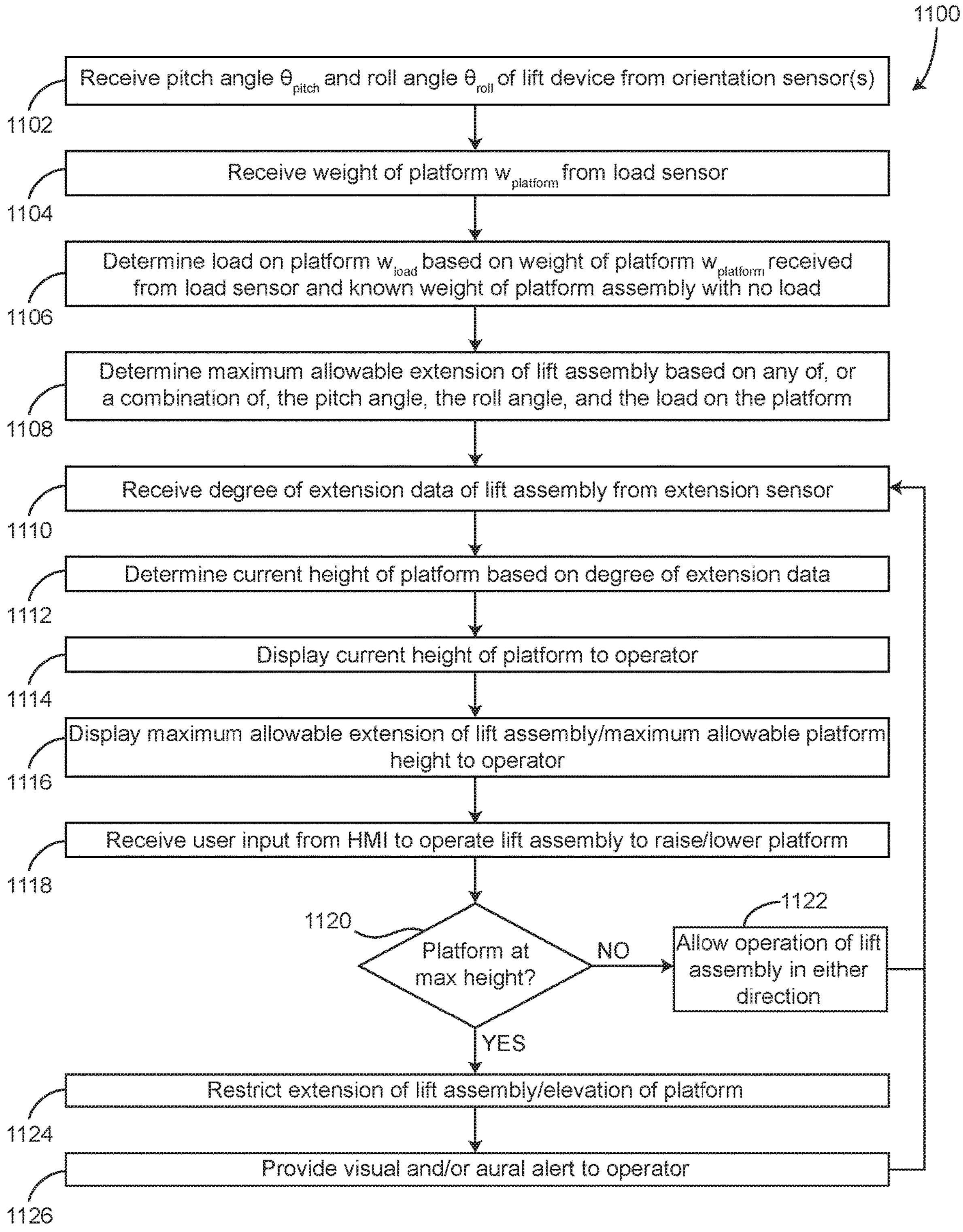
FIG. 11 is a flow diagram of a process for operating the lift device of FIG. 1, according to an exemplary embodiment.

Referring now to FIG. 11, a process 1100 for operating a lift device (e.g., a scissors lift) includes steps 1102-1126, according to an exemplary embodiment. Process 1100 can be performed by controller 104, according to some embodiments.

Process 1100 include receiving a pitch angle $\theta_{pitch}$ and a roll angle $\theta_{roll}$ of a lift device (e.g., lift device 10) from an orientation sensor (step 1102), according to some embodiments. The orientation sensor can be a single orientation sensor or a collection of orientation sensors that measure the orientation of lift device 10. The orientation sensor can be orientation sensor 106. Step 1102 can be performed by orientation sensor 106 and controller 104.

Process 1100 includes receiving a weight of a platform, $w_{platform}$, of lift device 10 from a load sensor (step 1104), according to some embodiments. In some embodiments, the weight of the platform is the weight of platform 16 as measured by load sensor 120. Step 1104 can be performed by load sensor 120 and controller 104.

Process 1100 includes determining a load applied to platform 16 ($w_{load}$) based on the weight of platform 16 ($w_{platform}$) and a known weight of platform 16 ($w_{platform,no\ load}$) (step 1106). In some embodiments, step 1106 includes determining the load applied to platform 16 using the equation $w_{load}=w_{platform}-w_{platform,no\ load}$, where $w_{load}$ is the weight of objects, people, equipment, etc., on platform 16, $w_{platform}$ is the weight of platform 16 as measured by load sensor 120, and w platform,no load is a known weight of platform 16 without any people, objects, equipment, etc., thereupon. In some embodiments, step 1106 is performed by controller 104.

Process 1100 includes determining a maximum allowable extension of lift assembly 14 (e.g., the maximum allowable height of platform 16, $h_{platform,max}$) based on any of, or a combination of, the pitch angle $\theta_{pitch}$ of platform 16, the roll angle $\theta_{roll}$ of platform 16, and the load (e.g., $w_{load}$ or $w_{platform}$) applied at platform 16 (step 1108), according to some embodiments. In some embodiment, step 1108 is performed by controller 104. Step 1108 can include determining the maximum allowable height of platform 16 ($h_{platform,max}$) for a specific model of lift device 10. For example, certain lift devices can have heavier frame assemblies 12, and therefore the maximum allowable height of platform 16 ($h_{platform,max}$) may be greater for heavier-framed lift devices. In some embodiments, step 1108 is performed using any of the processes, equations, functions, techniques, etc., described in greater detail above with reference to FIG. 8. The maximum allowable height facilitates reducing the likelihood of lift device 10 rolling or tipping when platform 16 is elevated/raised.

Process 1100 includes receiving degree of extension data of lift assembly 14 from extension sensor 110 (step 1110), according to some embodiments. The degree of extension data can be any angular measurement, distance, width, etc., of lift assembly 14 that indicates a degree of extension/retraction of lift assembly 14 as measured by extension sensor 110. The degree of extension/retraction of lift assembly 14 can be used to determine a current/actual height of platform 16. In some embodiments, step 1110 includes measuring the current/actual height of platform 16 is directly (e.g., by a proximity/distance sensor mounted to a bottom portion of platform 16). Step 1110 can be performed by extension sensor 110 and controller 104.

Process 1100 includes determining a current height of platform 16 (e.g., $h_{platform}$) based on the degree of extension data (step 1112), according to some embodiments. In some embodiments, known geometry, size, shape, etc., of lift assembly 14 is used to determine $h_{platform}$ based on the degree of extension data received in step 1110. In some embodiments, step 1112 is performed by controller 104.

Process 1100 includes displaying the current (e.g., actual) height of platform 16 to an operator of lift device 10 (step 1114), according to some embodiments. The current/actual height of platform 16 ($h_{platform}$) can be a distance between platform 16 and a ground surface, a distance between platform 16 and frame assembly 12, or a distance between platform 16 and any other reference point. Step 1114 can include providing a colored visual indication (e.g., colored text, a colored number) of $h_{platform}$ to the operator. Step 1114 can be performed by HMI 102, or more specifically, by display 920. In some embodiments, step 1114 is also performed by controller 104 (e.g., by generating and providing display signals to HMI 102).

Process 1100 includes displaying the maximum allowable extension of lift assembly 14 (e.g., the maximum allowable height of platform 16, $h_{platform,max}$) to the operator (step 1116), according to some embodiments. Step 1116 can be performed by HMI 102, or more specifically, display 920, by displaying maximum allowable height information 912 to the operator. In some embodiments, step 1116 is also performed by controller 104.

Process 1100 includes receiving a user input from HMI 102 to operate lift assembly 14 to raise/lower (e.g., increase or decrease the actual/current height of platform 16) platform 16 (step 1118), according to some embodiments. In some embodiments, the user input is received by controller 104 through HMI 102. For example, the user input can be provided to controller 104 through HMI 102 by flipping a switch, moving a joystick, pushing a lever, holding a spring-loaded button, etc., of HMI 102. In some embodiments, step 1118 is performed by HMI 102 and controller 104.

Process 1100 includes determining if platform 16 is at the maximum allowable height (e.g., if $h_{platform}=h_{platform,max}$) (step 1120), according to some embodiments. Step 1120 can additionally or otherwise include determining if lift assembly 14 has reached the maximum allowable extension. In some embodiments, step 1120 includes periodically (e.g., every 1 second, every 0.5 seconds, every 2 seconds, etc.) checking if platform 16 is at the maximum allowable height or if lift assembly 14 is at the maximum allowable extension. Step 1120 can be performed by controller 104. If platform 16 is at the maximum allowable height (e.g., $h_{platform}=h_{platform,max}$, step 1120 "YES") or if lift assembly 14 has reached the maximum allowable extension (step 1120, "YES"), process 1100 proceeds to step 1124. If platform 16 is not at the maximum allowable height (e.g., $h_{platform}<h_{platform,max}$, step 1120 "NO") or if lift assembly 14 has not yet reached the maximum allowable extension (step 1120, "NO"), process 1100 proceeds to step 1122.

Process 1100 includes allowing operation of lift assembly 14 to raise/lower platform 16 (step 1122). In some embodiments, step 1122 is performed by controller 104. In some embodiments, controller 104 allows extension/retraction of lift assembly 14 (e.g., raising and lowering of platform 16) only if platform 16 is not at the maximum allowable height (e.g., $h_{platform}<h_{platform,max}$, step 1120 "NO"). In some embodiments, step 1122 includes generating control signals and providing the control signals to lift actuators 66 to raise/lower platform 16 in response to receiving a user input from the operator through HMI 102. In some embodiments, process 1100 includes returning to step 1110 in response to performing step 1122.

Process 1100 includes restricting extension of lift assembly 14 (step 1124) to prevent raising platform 16, according to some embodiments. In some embodiments, step 1124 is performed in response to platform 16 being at the maximum allowable height (e.g., $h_{platform}=h_{platform,max}$, step 1120 "YES"). In some embodiments, step 1124 is performed by controller 104. If platform 16 is at the maximum allowable height, controller 104 can restrict further extension of lift assembly 14 and further elevation/raising of platform 16. However, controller 104 may allow retraction of lift assembly 14 and lowering of platform 16, even if platform 16 is at the maximum allowable height.

Process 1100 includes providing a visual and/or an aural alert to the operator (step 1126), according to some embodiments. In some embodiments, step 1126 is performed in response to platform 16 being at the maximum allowable height or in response to lift assembly 14 being at the maximum allowable extension (step 1120, "YES"). Step 1126 can include providing a visual alert (e.g., blinking a light, changing a color on display 920, etc.) and/or an aural alert (e.g., producing a buzzing noise, a beeping noise, a tone, a siren, etc., with speakers 922). In some embodiments, the visual and/or the aural alert are provided to the operator in response to the operator attempting to operate lift assembly 14 to elevate platform 16 further when platform 16 is at the maximum allowable height (e.g., when $h_{platform}=h_{platform,max}$). Process 1100 includes returning to step 1110 in response to performing step 1126.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A lift device, comprising:

a lift assembly configured to be driven to increase or decrease in length along an upwards direction by extension and retraction of one or more actuators, the upwards direction being substantially perpendicular with a ground surface upon which the lift device is positioned;

a platform coupled at an upper end of the lift assembly;

a controller configured to:

receive a value of a pitch angle and a roll angle of the lift device from an orientation sensor, the value of the pitch angle and the roll angle indicating a slope of the ground surface in at least one direction;

receive a value of load on the platform from a load sensor;

determine a maximum allowable elevation of the platform based on the value of load on the platform and at least one of the value of the roll angle and the value of the pitch angle of the lift device; and limit operation of the lift assembly based on the maximum allowable elevation of the platform.

2. The lift device of claim 1, wherein the controller is further configured to prevent an operator from operating the lift assembly to elevate the platform above the maximum allowable elevation of the platform.

3. The lift device of claim 1, wherein the maximum allowable elevation of the platform maintains a tipping moment of the platform below a threshold value.

4. The lift device of claim 1, wherein the controller is further configured to operate an alert device of the lift device to provide an alert to a user in response to the lift assembly operating to elevate the platform to the maximum allowable elevation.

5. The lift device of claim 1, further comprising a user interface device, wherein the controller is configured to:

operate the user interface device to display a current elevation of the platform; and operate the user interface device to display the maximum allowable elevation of the platform.

6. The lift device of claim 1, wherein the controller is configured to monitor a current elevation of the platform and limit operation of the lift assembly to increase in length when the current elevation of the platform is substantially equal to the maximum allowable elevation.

7. The lift device of claim 1, further comprising a plurality of leveling actuators, wherein the leveling actuators are configured to extend or retract to adjust the pitch angle or the roll angle of the lift device, the controller configured to:

operate the plurality of leveling actuators to extend or retract using the value of the pitch angle and the value of the roll angle to decrease the value of the pitch angle and the value of the roll angle.

8. The lift device of claim 1, wherein the load sensor is positioned at a coupling between the lift assembly and the platform.

9. A lift device, comprising:

a lift assembly configured to be driven to increase or decrease in length along an upwards direction by extension and retraction of one or more actuators, the upwards direction being substantially perpendicular with a ground surface upon which the lift device is positioned;

a platform coupled at an upper end of the lift assembly;

a controller configured to:

receive a value of a pitch angle and a roll angle of the lift device from an orientation sensor, the value of the pitch angle and the roll angle indicating a slope of the ground surface in at least one direction;

receive a value of load on the platform from a load sensor;

determine a threshold elevation of the platform based on the value of load and at least one of the value of the roll angle and the value of the pitch angle of the lift device; and limit operation of the lift assembly based on the threshold elevation of the platform.

10. The lift device of claim 9, wherein the controller is further configured to prevent an operator from operating the lift assembly to elevate the platform above the threshold elevation of the platform.

11. The lift device of claim 9, wherein the threshold elevation of the platform maintains a tipping moment of the platform below a threshold value.

12. The lift device of claim 9, wherein the controller is further configured to operate an alert device of the lift device to provide an alert to a user in response to the lift assembly operating to elevate the platform to the threshold elevation.

13. The lift device of claim 9, further comprising a user interface device, wherein the controller is configured to:

operate the user interface device to display a current elevation of the platform; and operate the user interface device to display the threshold elevation of the platform.

14. The lift device of claim 9, wherein the controller is configured to monitor a current elevation of the platform and limit operation of the lift assembly to increase in length when the current elevation of the platform is substantially equal to the threshold elevation.

15. The lift device of claim 9, further comprising a plurality of leveling actuators, wherein the leveling actuators are configured to extend or retract to adjust the pitch angle or the roll angle of the lift device, the controller configured to:

operate the plurality of leveling actuators to extend or retract using the value of the pitch angle and the value of the roll angle to decrease the value of the pitch angle and the value of the roll angle.

16. The lift device of claim 9, wherein the load sensor is positioned at a coupling between the lift assembly and the platform.

17. A lift device, comprising:

a lift assembly configured to be driven to increase or decrease in length along an upwards direction by extension and retraction of one or more actuators, the upwards direction being substantially perpendicular with a ground surface upon which the lift device is positioned;

a platform coupled at an upper end of the lift assembly;

a controller configured to:

receive a value of a pitch angle and a roll angle of the lift device from an orientation sensor, the value of the pitch angle and the roll angle indicating a slope of the ground surface in at least one direction;

receive a value of load on the platform from a load sensor;

determine a maximum allowable elevation of the platform based on the value of load on the platform and at least one of the value of the roll angle and the value of the pitch angle of the lift device; and limit operation of the lift assembly based on the maximum allowable elevation of the platform;

wherein the controller is further configured to prevent an operator from operating the lift assembly to elevate the platform above the maximum allowable elevation of the platform; and wherein the maximum allowable elevation of the platform maintains a tipping moment of the platform below a threshold value.

18. The lift device of claim 17, wherein the controller is further configured to operate an alert device of the lift device to provide an alert to a user in response to the lift assembly operating to elevate the platform to the maximum allowable elevation.

19. The lift device of claim 17, further comprising a user interface device, wherein the controller is configured to:

operate the user interface device to display a current elevation of the platform; and operate the user interface device to display the maximum allowable elevation of the platform.

20. The lift device of claim 17, further comprising a plurality of leveling actuators, wherein the leveling actuators are configured to extend or retract to adjust the pitch angle or the roll angle of the lift device, the controller configured to:

operate the plurality of leveling actuators to extend or retract using the value of the pitch angle and the value of the roll angle to decrease the value of the pitch angle and the value of the roll angle.

* * * * *